US008699805B2

(12) United States Patent
Shiraishi

(10) Patent No.: US 8,699,805 B2
(45) Date of Patent: Apr. 15, 2014

(54) IMAGE PROCESSING APPARATUS AND IMAGE PROCESSING METHOD

(75) Inventor: Naoto Shiraishi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 526 days.

(21) Appl. No.: 13/091,452

(22) Filed: Apr. 21, 2011

(65) Prior Publication Data

US 2011/0273736 A1 Nov. 10, 2011

(30) Foreign Application Priority Data

May 7, 2010 (JP) ................................. 2010-107728

(51) Int. Cl.
G06K 9/36 (2006.01)
G06K 9/46 (2006.01)

(52) U.S. Cl.
USPC ........................................... 382/233; 382/246

(58) Field of Classification Search
USPC .......................... 382/233, 246, 309; 358/1.14
See application file for complete search history.

(56) References Cited

U.S. PATENT DOCUMENTS

| 4,837,634 | A | * | 6/1989 | Hisada ..................... 358/426.12 |
| 5,337,168 | A | | 8/1994 | Fujii et al. |
| 5,341,468 | A | | 8/1994 | Shiraishi et al. |
| 5,396,585 | A | | 3/1995 | Fujii et al. |
| 5,448,690 | A | | 9/1995 | Shiraishi et al. |
| 5,455,900 | A | | 10/1995 | Shiraishi et al. |
| 5,459,822 | A | | 10/1995 | Izawa et al. |
| 5,465,371 | A | | 11/1995 | Fujii et al. |
| 5,502,802 | A | | 3/1996 | Shiraishi |
| 5,551,019 | A | | 8/1996 | Izawa et al. |
| 5,732,204 | A | | 3/1998 | Fukushima et al. |
| 5,739,826 | A | | 4/1998 | Shiraishi et al. |
| 5,828,378 | A | | 10/1998 | Shiraishi |
| 5,903,276 | A | | 5/1999 | Shiraishi |
| 6,172,678 | B1 | | 1/2001 | Shiraishi |
| 6,342,950 | B1 | * | 1/2002 | Tabata et al. .................. 358/1.6 |
| 6,915,017 | B2 | | 7/2005 | Shiraishi |

(Continued)

FOREIGN PATENT DOCUMENTS

| JP | H05-236283 | 9/1993 |
| JP | 2003-233396 | 8/2003 |
| JP | 2005-269081 | 9/2005 |
| JP | 4000266 | 8/2007 |
| JP | 2008-182690 | 8/2008 |
| JP | 4664174 | 1/2011 |

OTHER PUBLICATIONS

U.S. Appl. No. 07/727,832, filed Jul. 9, 1991, Naoto Shiraishi.

(Continued)

Primary Examiner — Phuoc Tran
(74) Attorney, Agent, or Firm — Oblon, Spivak, McClelland, Maier & Neustadt, L.L.P.

(57) ABSTRACT

An image processing apparatus includes: a decoding unit; a printing unit; an error detecting unit; and a control unit. The decoding unit decodes code data, which is obtained by encoding image data with a variable-length code on a line-to-line basis, into the image data. The printing unit performs a printing process on the basis of the image data which is decoded from the code data by the decoding unit. The error detecting unit compares a decoding amount indicating the amount of code data decoded in a predetermined range by the decoding unit with a predetermined decoding amount and outputs an error signal when the decoding amount is different from the predetermined decoding amount. The control unit controls the printing unit to stop the printing process when the error signal is output from the error detecting unit.

8 Claims, 34 Drawing Sheets

(56) References Cited

U.S. PATENT DOCUMENTS

| | | |
|---|---|---|
| 6,941,023 B2 | 9/2005 | Shiraishi |
| 7,009,622 B2 | 3/2006 | Shiraishi |
| 7,079,691 B2 | 7/2006 | Shiraishi |
| 7,233,702 B2 | 6/2007 | Shiraishi |
| 7,359,557 B2 | 4/2008 | Shiraishi |
| 7,454,528 B2 | 11/2008 | Kanoshima et al. |
| 7,456,985 B2 | 11/2008 | Shiraishi |
| 7,483,586 B2 | 1/2009 | Shiraishi |
| 7,573,614 B2 | 8/2009 | Shiraishi |
| 2005/0246684 A1 | 11/2005 | Shiraishi |
| 2009/0051942 A1 | 2/2009 | Kanoshima et al. |
| 2009/0060325 A1 | 3/2009 | Shiraishi |
| 2009/0128857 A1 | 5/2009 | Shiraishi |

OTHER PUBLICATIONS

U.S. Appl. No. 07/932,357, filed Aug. 19, 1992, Naoto Shiraishi.
U.S. Appl. No. 07/827,635, filed Jan. 29, 1992, Tatsuya Fujii.
U.S. Appl. No. 08/076,989, filed Jun. 15, 1993.
U.S. Appl. No. 08/597,344, filed Feb. 6, 1996.
U.S. Appl. No. 08/102,050, filed Aug. 4, 1993, Naoto Shiraishi.
U.S. Appl. No. 08/317,116, filed Oct. 3, 1994.
U.S. Appl. No. 08/381,102, filed Jan. 31, 1995, Masanobu Fukushima.
Office Action dated Feb. 12, 2014, in Japanese Patent Application No. 2010-107728.

\* cited by examiner

FIG.9A

| CODE NAME | CODE | CODE LENGTH |
|---|---|---|
| INDEX00 | 0b001 | 3 |
| INDEX01 | 0b010 | 3 |
| INDEX02 | 0b011 | 3 |
| INDEX03 | 0b1000 | 4 |
| INDEX04 | 0b1001 | 4 |
| INDEX05 | 0b1010 | 4 |
| INDEX06 | 0b1011 | 4 |
| INDEX07 | 0b110000 | 6 |
| INDEX08 | 0b110001 | 6 |
| INDEX09 | 0b110010 | 6 |
| INDEX10 | 0b110011 | 6 |
| INDEX11 | 0b110100 | 6 |
| INDEX12 | 0b110101 | 6 |
| INDEX13 | 0b110110 | 6 |
| INDEX14 | 0b110111 | 6 |
| INDEX15 | 0b111000 | 6 |
| INDEX16 | 0b111001 | 6 |
| INDEX17 | 0b111010 | 6 |
| INDEX18 | 0b111011 | 6 |
| INDEX19 | 0b111100 | 6 |
| INDEX20 | 0b111101 | 6 |
| INDEX21 | 0b111110 | 6 |
| INDEX22 | 0b111111000 | 9 |
| INDEX23 | 0b111111001 | 9 |
| INDEX24 | 0b111111010 | 9 |
| INDEX25 | 0b111111011 | 9 |
| INDEX26 | 0b111111100 | 9 |
| INDEX27 | 0b111111101 | 9 |
| INDEX28 | 0b111111110 | 9 |
| INDEX29 | 0b111111111000 | 12 |
| INDEX30 | 0b111111111001 | 12 |
| INDEX31 | 0b111111111010 | 12 |

FIG.9B

| CODE NAME | CODE | CODE LENGTH |
|---|---|---|
| ESC HEADER | 0b000 | 3 |
| ESC DATA | (16 BITS) | 16 |

FIG.9C

| CODE NAME | CODE | CODE LENGTH |
|---|---|---|
| LINE END CODE | 0b111111111111 | 12 |

FIG.13

INPUT DATA 0x5555 →

| DICTIONARY DATA | INDEX |
|---|---|
| 0x0123 | 1 |
| 0x4567 | 2 |
| 0x89AB | 3 |
| 0xCDEF | 4 |
| 0x3210 | 5 |
| 0x7654 | 6 |
| 0xBA98 | 7 |
| 0xFEDC | 8 |
| 0x0000 | 9 |
| 0x1111 | 10 |
| 0x2222 | 11 |
| 0x3333 | 12 |
| 0x4444 | 13 |
| 0x5555 | (14) |
| 0x6666 | 15 |
| 0x7777 | 16 |
| 0x8888 | 17 |
| 0x9999 | 18 |
| 0xAAAA | 19 |
| 0xBBBB | 20 |
| 0xCCCC | 22 |
| 0xDDDD | 22 |
| 0xEEEE | 23 |
| 0xFFFF | 24 |
| 0x0011 | 25 |
| 0x2233 | 26 |
| 0x4455 | 27 |
| 0x6677 | 28 |
| 0x8899 | 29 |
| 0xAABB | 30 |
| 0xCCDD | 31 |
| 0xEEFF | 32 |

→ OUTPUT SYMBOL

FIG.22

| CODE NAME | CODE | CODE LENGTH |
|---|---|---|
| ESC | 0b000_xxxxxxxx_xxxxxxxx | 19 |
| INDEX00 | 0b001 | 3 |
| INDEX01 | 0b010 | 3 |
| INDEX02 | 0b011 | 3 |
| INDEX03 | 0b1000 | 4 |
| INDEX04 | 0b1001 | 4 |
| INDEX05 | 0b1010 | 4 |
| INDEX06 | 0b1011 | 4 |
| INDEX07 | 0b110000 | 6 |
| INDEX08 | 0b110001 | 6 |
| INDEX09 | 0b110010 | 6 |
| INDEX10 | 0b110011 | 6 |
| INDEX11 | 0b110100 | 6 |
| INDEX12 | 0b110101 | 6 |
| INDEX13 | 0b110110 | 6 |
| INDEX14 | 0b110111 | 6 |
| INDEX15 | 0b111000 | 6 |
| INDEX16 | 0b111001 | 6 |
| INDEX17 | 0b111010 | 6 |
| INDEX18 | 0b111011 | 6 |
| INDEX19 | 0b111100 | 6 |
| INDEX20 | 0b111101 | 6 |
| INDEX21 | 0b111110 | 6 |
| INDEX22 | 0b111111000 | 9 |
| INDEX23 | 0b111111001 | 9 |
| INDEX24 | 0b111111010 | 9 |
| INDEX25 | 0b111111011 | 9 |
| INDEX26 | 0b111111100 | 9 |
| INDEX27 | 0b111111101 | 9 |
| INDEX28 | 0b111111110 | 9 |
| INDEX29 | 0b111111111000 | 12 |
| INDEX30 | 0b111111111001 | 12 |
| INDEX31 | 0b111111111010 | 12 |
| IMPOSSIBLE CODE | 0b111111111011 | 12 |
| IMPOSSIBLE CODE | 0b111111111100 | 12 |
| IMPOSSIBLE CODE | 0b111111111101 | 12 |
| IMPOSSIBLE CODE | 0b111111111110 | 12 |
| LINE END | 0b111111111111 | 12 |

FIG.23

| CODE | CODE NAME | CODE LENGTH |
|---|---|---|
| 0b001x_xxxx_xxxx | INDEX00 | 3 |
| 0b010x_xxxx_xxxx | INDEX01 | 3 |
| 0b011x_xxxx_xxxx | INDEX02 | 3 |
| 0b1000_xxxx_xxxx | INDEX03 | 4 |
| 0b1001_xxxx_xxxx | INDEX04 | 4 |
| 0b1010_xxxx_xxxx | INDEX05 | 4 |
| 0b1011_xxxx_xxxx | INDEX06 | 4 |
| 0b110000_xx_xxxx | INDEX07 | 6 |
| 0b110001_xx_xxxx | INDEX08 | 6 |
| 0b110010_xx_xxxx | INDEX09 | 6 |
| 0b110011_xx_xxxx | INDEX10 | 6 |
| 0b110100_xx_xxxx | INDEX11 | 6 |
| 0b110101_xx_xxxx | INDEX12 | 6 |
| 0b110110_xx_xxxx | INDEX13 | 6 |
| 0b110111_xx_xxxx | INDEX14 | 6 |
| 0b111000_xx_xxxx | INDEX15 | 6 |
| 0b111001_xx_xxxx | INDEX16 | 6 |
| 0b111010_xx_xxxx | INDEX17 | 6 |
| 0b111011_xx_xxxx | INDEX18 | 6 |
| 0b111100_xx_xxxx | INDEX19 | 6 |
| 0b111101_xx_xxxx | INDEX20 | 6 |
| 0b111110_xx_xxxx | INDEX21 | 6 |
| 0b111111000_xxx | INDEX22 | 9 |
| 0b111111001_xxx | INDEX23 | 9 |
| 0b111111010_xxx | INDEX24 | 9 |
| 0b111111011_xxx | INDEX25 | 9 |
| 0b111111100_xxx | INDEX26 | 9 |
| 0b111111101_xxx | INDEX27 | 9 |
| 0b111111110_xxx | INDEX28 | 9 |
| 0b111111111000 | INDEX29 | 12 |
| 0b111111111001 | INDEX30 | 12 |
| 0b111111111010 | INDEX31 | 12 |

FIG.24

| | 0 | 1 | 2 | 3 | 4 | 5 | 6 | 7 |
|---|---|---|---|---|---|---|---|---|
| 16-BIT IMAGE DATA | 0xFFFF | 0xFFFF | 0xF333 | 0x3333 | 0x3333 | 0x3333 | 0x3333 | 0xFFFF |
| CODE | ESC+0xFFFF | Index00 | ESC+0xF333 | ESC+0x3333 | Index00 | Index00 | ESC+0x333F | Index03 |
| | | | | | | | | LINE END |
| DICTIONARY 00 | | 0xFFFF | 0xFFFF | 0xF333 | 0x3333 | 0x3333 | 0x3333 | 0x333F |
| DICTIONARY 01 | | | 0xFFFF | 0xF333 | 0xF333 | 0xF333 | 0xF333 | 0x3333 |
| DICTIONARY 02 | | | | 0xFFFF | 0xFFFF | 0xFFFF | 0xFFFF | 0xF333 |
| DICTIONARY 03 | | | | | | | | 0xFFFF |
| DICTIONARY 04 | | | | | | | | |
| DICTIONARY 05 | | | | | | | | |

| | 0 | 1 | 2 | 3 | 4 | 5 | 6 | 7 | 8 |
|---|---|---|---|---|---|---|---|---|---|
| 12 BITS FROM HEAD OF CODE | 0b0001_1111_1111 | 0b0010_0011_1100 | 0b0001_1110_0110 | 0b0000_0110_0110 | 0b0010_0100_0001 | 0b0010_0000_1100 | 0b0000_0110_0110 | 0b1000_1111_1111 | 0b1111_1111_1111 |
| CONSUMED CODE LENGTH | 19 | 3 | 19 | 19 | 3 | 3 | 19 | 4 | 12 |
| DECODED CODE | ESC+0xFFFF | Index00 | ESC+0xF333 | ESC+0x3333 | Index00 | Index00 | ESC+0x333F | Index03 | LINE END |
| DECODED 16-BIT IMAGE DATA | 0xFFFF | 0xFFFF | 0xF333 | 0x3333 | 0x3333 | 0x3333 | 0x333F | 0xFFFF | |
| DICTIONARY 00 | | 0xFFFF | 0xFFFF | 0xF333 | 0x3333 | 0x3333 | 0x3333 | 0x333F | 0xFFFF |
| DICTIONARY 01 | | | | 0xFFFF | 0xF333 | 0xF333 | 0xF333 | 0x3333 | 0x333F |
| DICTIONARY 02 | | | | | 0xFFFF | 0xFFFF | 0xFFFF | 0xF333 | 0x3333 |
| DICTIONARY 03 | | | | | | | | 0xFFFF | 0xF333 |
| DICTIONARY 04 | | | | | | | | | |
| DICTIONARY 05 | | | | | | | | | |

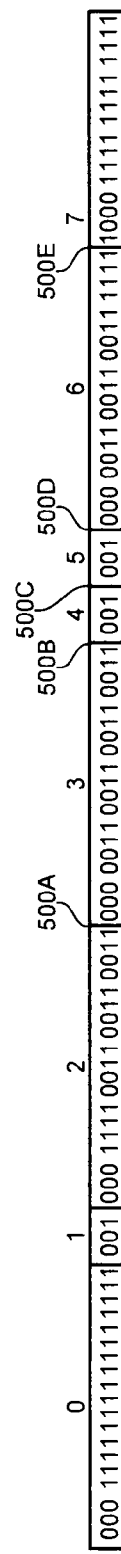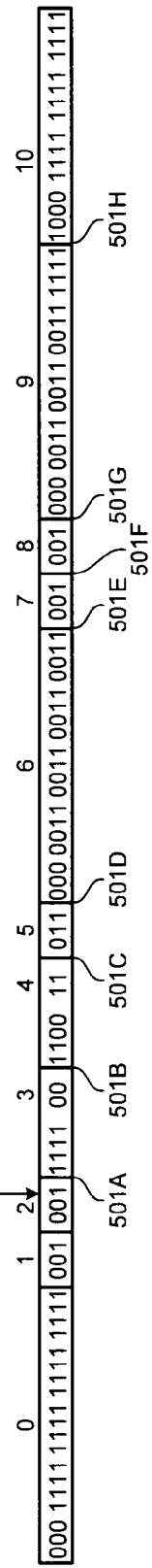
FIG.27A
FIG.27B

FIG.28

| | 0 | 1 | 2 | 3 | 4 | 5 | 6 | 7 | 8 |
|---|---|---|---|---|---|---|---|---|---|
| 12 BITS FROM HEAD OF CODE | 0b0001_1111 | 0b0010_0011_1100 | 0b0011_1110_0170 | 0b1111_0011_0071 | 0b1100_1101_1000 | 0b0110_0000_1100 | 0b0000_0110_0170 | 0b0010_0100_0001 | 0b0010_0000_1100 |
| CONSUMED CODE LENGTH | 19 | 3 | 3 | 6 | 6 | 3 | 19 | 3 | 3 |
| DECODED CODE | ESC+0xFFFF | Index00 | Index00 | index19 | Index10 | Index2 | ESC+0x3333 | Index00 | Index00 |
| | | | | | | | | | |
| DECODED 16-BIT IMAGE DATA | 0xFFFF | 0xFFFF | 0xFFFF | 0x???? | 0x???? | 0xFFFF | 0x3333 | 0x3333 | 0x3333 |
| | | | | | | | | | |
| DICTIONARY 00 | | 0xFFFF | 0xFFFF | 0xFFFF | 0x???? | 0x???? | 0xFFFF | 0x3333 | 0x3333 |
| DICTIONARY 01 | | | | | 0xFFFF | 0x???? | 0x???? | 0xFFFF | 0xFFFF |
| DICTIONARY 02 | | | | | | 0xFFFF | 0x???? | 0x???? | 0x???? |
| DICTIONARY 03 | | | | | | | 0x???? | 0x???? | 0x???? |
| DICTIONARY 04 | | | | | | | | | |
| DICTIONARY 05 | | | | | | | | | |

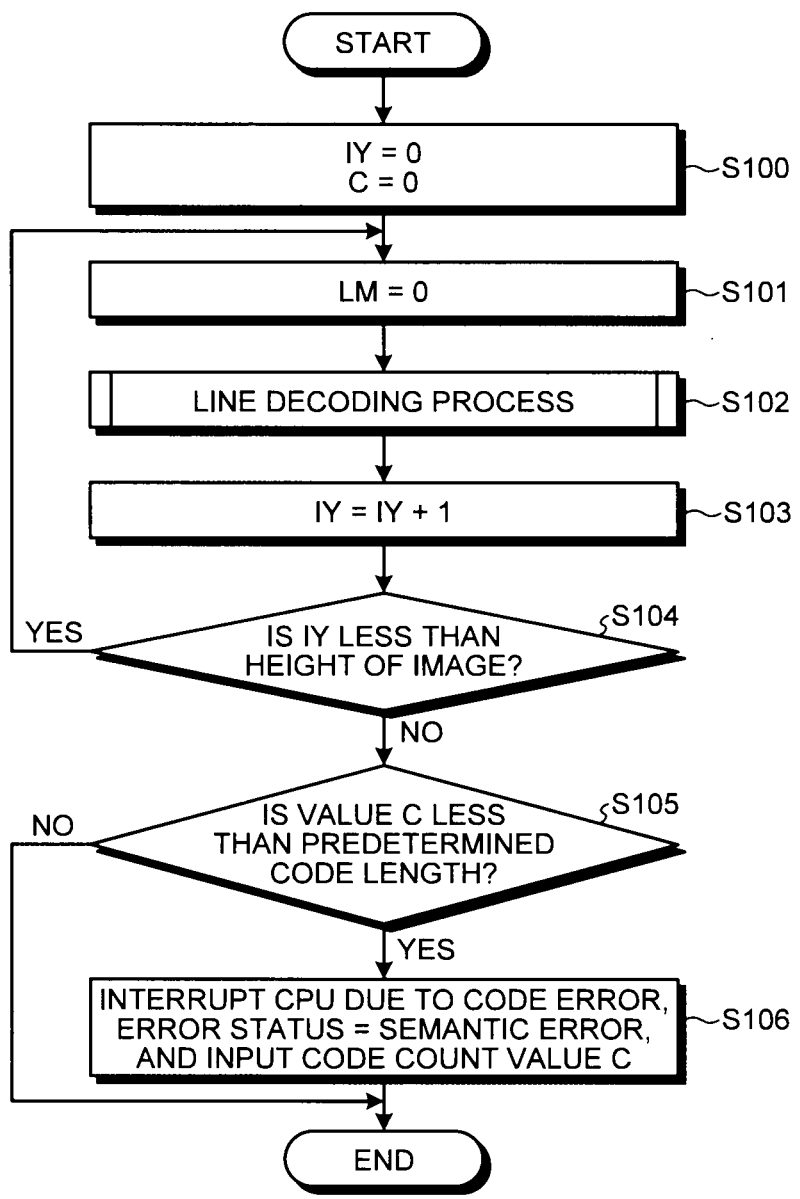

FIG.34

INPUT INDEX
14

| INDEX | DICTIONARY DATA |
|---|---|
| 1 | 0x0123 |
| 2 | 0x4567 |
| 3 | 0x89AB |
| 4 | 0xCDEF |
| 5 | 0x3210 |
| 6 | 0x7654 |
| 7 | 0xBA98 |
| 8 | 0xFEDC |
| 9 | 0x0000 |
| 10 | 0x1111 |
| 11 | 0x2222 |
| 12 | 0x3333 |
| 13 | 0x4444 |
| (14) | 0x5555 |
| 15 | 0x6666 |
| 16 | 0x7777 |
| 17 | 0x8888 |
| 18 | 0x9999 |
| 19 | 0xAAAA |
| 20 | 0xBBBB |
| 21 | 0xCCCC |
| 22 | 0xDDDD |
| 23 | 0xEEEE |
| 24 | 0xFFFF |
| 25 | 0x0011 |
| 26 | 0x2233 |
| 27 | 0x4455 |
| 28 | 0x6677 |
| 29 | 0x8899 |
| 30 | 0xAABB |
| 31 | 0xCCDD |
| 32 | 0xEEFF |

OUTPUT DATA
0x5555

IMAGE PROCESSING APPARATUS AND IMAGE PROCESSING METHOD

CROSS-REFERENCE TO RELATED APPLICATIONS

The present application claims priority to and incorporates by reference the entire contents of Japanese Patent Application No. 2010-107728 filed in Japan on May 7, 2010.

BACKGROUND OF THE INVENTION

1. Field of the Invention

The present invention relates to an image processing apparatus and an image processing method that decode compressed and coded image data.

2. Description of the Related Art

An image forming apparatus, such as a printer, temporarily stores image data in a memory. In this case, when the image data is stored in the memory without any change, a high-capacity memory is needed, which results in an increase in cost. In order to solve this problem, the image data is compressed and is then stored in the memory.

For example, a print process of the printer is performed as follows. The printer receives a page description language (PDL) which is created by, for example, a computer through a network and analyzes the PDL to generate an intermediate language that can be executed by a drawing unit. A drawing unit analyzes the intermediate language and draws an image subjected to gradation processing to a band memory. The drawn image data is compressed and coded by a binary image compression coding algorithm, and the generated code data is stored in the memory. Thereafter, during a print operation, the code data is read from the memory while being delayed for each of C, M, Y, and K and the read code data is decoded. Then, the data corresponding to each of C, M, Y, and K is transmitted to the printer engine and is then printed.

As a method of effectively performing compression coding on a binary image, there has been known a compression coding method using a variable-length code. For the variable-length code, a short code is allocated to a value with a high frequency of appearance, and the allocated code length increases as the frequency of appearance is reduced. In this way, data is compressed.

For the variable-length code, there is a concern that the codes after the error position cannot be normally decoded when an error is mixed with the code in, for example, a transmission path. In order to prevent the mixture of an error with the code, Japanese Patent Application Laid-open No. 2003-233396 discloses a technique in which a synchronization code is inserted into a packet having bit streams divided by variable-length codes therein, thereby preventing the transmission of the error of the code.

However, for example, in an ink jet printer, when printing is performed with the amount of ink more than a predetermined value, a sheet is loosened by ink and a sheet discharge problem is likely to occur. The program is particularly serious in double-side printing. Therefore, Japanese Patent Application Laid-open No. 2007-091398 discloses a technique that regulates the total amount of ink discharged during double-side printing to prevent a sheet discharge problem during double-side printing.

The method of regulating the total amount of ink is applicable to a printer that performs printing with toner, in addition to the ink jet printer. That is, it is possible to reduce the load of a printing mechanism by limiting the total amount of toner attached to each of the C, M, Y, and K plates.

During compression coding with the variable-length code, generally, the syntax error of the code is recognized when a code that is absent in the code table, that is, a code to which no data value is allocated is decoded. In the coding process, in order to effectively perform coding, the codes are sequentially arranged as consecutively as possible in increasing order of a code length, and codes that are absent in the code table have very long code lengths. Since a code with a short code length has a very low frequency of appearance, incorrect codes are likely to be decoded from the point of time when an error actually occurs, when the syntax error is recognized. In the case of the printer, there is a concern that print quality will deteriorate.

For example, a printer connected to a network receives codes from a printer server, sequentially decodes the received codes, and performs printing. In this case, the transmission path of the codes is generally a wire and a CRC (cyclic redundancy check) code is added to increase error tolerance. Therefore, a code error is less likely to occur in the transmission system. In the printer connected to the network, it is considered that an error occurs due to, for example, an error in the process of creating codes in the printer server, the difference in specifications between the printer and the printer server, or a hardware defect.

In Japanese Patent Application Laid-open No. 2003-233396, the synchronization code is detected from the packet that has caused an error and the decoding of the code is resumed from the next packet, thereby continuously reproducing bit streams. Japanese Patent Application Laid-open No. 2003-233396 discloses a solution when an error occurs in a packet skip process and it is considered that no problem arises even when the packet having an error is discarded.

However, basically, the printer should not perform defective printing. Therefore, it is difficult to perform the process of discarding the packet with an error and decoding the next packet, thereby continuously reproducing bit streams, as in Japanese Patent Application Laid-open No. 2003-233396.

As described above, since the syntax error is recognized by the code with a very long code length, many incorrect codes are likely to be decoded from the position where an error actually occurs. The image data decoded from the incorrect codes is beyond the restriction of the total amount of ink discharged or the total amount of toner adhered and there is a concern that an unnecessary load will be applied to the printing mechanism. In particular, in the ink jet printer, when printing is performed with more than a predetermined amount of ink, there is a concern that a large load will be applied to the printing mechanism due to, for example, the curling of the sheet during the discharge of the sheet, as described above.

SUMMARY OF THE INVENTION

It is an object of the present invention to at least partially solve the problems in the conventional technology.

According to an aspect of the present invention, an image processing apparatus includes: a decoding unit that decodes code data, which is obtained by encoding image data with a variable-length code on a line-to-line basis, into the image data; a printing unit that performs a printing process on the basis of the image data which is decoded from the code data by the decoding unit; an error detecting unit that compares a decoding amount indicating the amount of code data decoded in a predetermined range by the decoding unit with a predetermined decoding amount and outputs an error signal when the decoding amount is different from the predetermined decoding amount; and a control unit that controls the printing unit to stop the printing process when the error signal is output from the error detecting unit.

According to another aspect of the present invention, an image processing method includes: a decoding step of allowing a decoding unit to decode code data, which is obtained by encoding image data with a variable-length code on a line-to-line basis, into the image data; a printing step of allowing a printing unit to perform a printing process on the basis of the image data which is decoded from the code data in the decoding step; an error detecting step of allowing an error detecting unit to compare a decoding amount indicating the amount of code data decoded in a predetermined range in the decoding step with a predetermined decoding amount, and to output an error signal when the decoding amount is different from the predetermined decoding amount; and a control step of allowing a control unit to control the printing step to stop the printing process when the error signal is output from the error detecting step.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 9A to 9C are diagrams schematically illustrating an example of a code format applicable to this embodiment;

FIG. 13 is a diagram illustrating the dictionary search process in detail;

FIG. 22 is a diagram schematically illustrating the detection of a syntax error;

FIG. 23 is a diagram schematically illustrating an example of a reverse code table corresponding to a code table;

FIG. 24 is a diagram illustrating an example of an MTF coding process in detail;

FIGS. 25A and 25B are diagrams illustrating the codes encoded by the MTF coding process with detailed values;

FIG. 26 is a diagram illustrating in detail an example of an MTF code decoding process;

FIGS. 27A and 27B are diagrams schematically illustrating a case in which an error is included in code data to be decoded;

FIG. 28 is a diagram schematically illustrating a case in which an error is included in code data to be decoded;

FIG. 29 is a flowchart illustrating an example of the overall flow of the decoding process;

FIG. 34 is a diagram schematically illustrating a process of accessing a dictionary using a value DICTNUM as an index to calculate dictionary data;

DETAILED DESCRIPTION OF THE PREFERRED EMBODIMENTS

Figure 1:
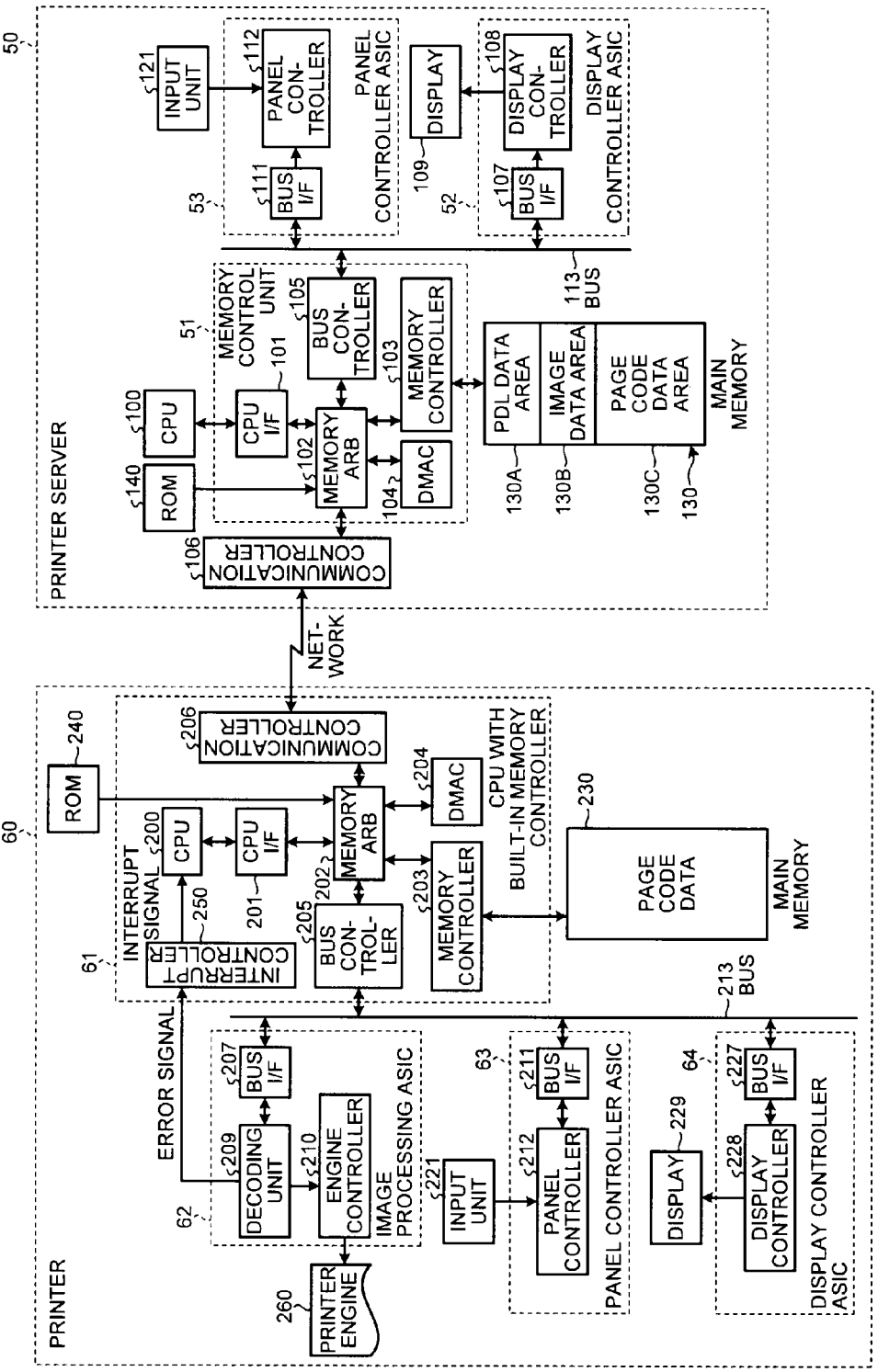
FIG. 1 is a block diagram illustrating the structure of an example of a printing system applicable to an embodiment.

Hereinafter, an image processing apparatus according to an embodiment of the invention will be described in detail with reference to the accompanying drawings. FIG. 1 illustrates the structure of an example of a printing system applicable to this embodiment. In the printing system shown in FIG. 1, a printer server 50 and a printer 60 are connected to each other by a network, the printer server 50 transmits compressed and coded image data to the printer 60 through the network, and the printer 60 performs printing on the basis of the image data.

Specifically, for example, the printer server 50 generates image data on the basis of Page Description Language (PDL) data transmitted from, for example, a computer (not shown) through the network and performs compression coding on the generated image data. Then, the printer server 50 transmits code data obtained by performing compression coding on the image data and attribute data related to printing, such as the size of a sheet to be printed or printing resolution, which is included in, for example, the PDL data, to the printer 60 through the network. The printer 60 receives the transmitted code data and attribute data, decodes the code data into the image data, and performs a printing operation on the basis of the image data and the attribute data.

First, the printer server 50 will be described. In FIG. 1, the printer server 50 includes a Central Processing Unit (CPU) 100, a memory control unit 51, an Application Specific Integrated Circuit (ASIC) 52 for a display controller, an ASIC 53 for a panel controller, a main memory 130, and a ROM 140 that stores programs. The memory control unit 51, the ASIC 52 for the display controller, and the ASIC 53 for the panel controller can communicate with one another through a bus 113.

The memory control unit 51 includes a CPU I/F 101, a memory arbiter (ARB) 102, a memory controller 103, a Direct Memory Access (DMA) controller 104 (abbreviated to DMAC in the drawings), and a bus controller 105. A communication controller 106 is connected to the memory arbiter 102.

The CPU 100 is connected to the memory arbiter 102 through the CPU I/F 101 and controls the overall operation of the printer server 50 according to the programs stored in the ROM 140. The CPU 100 analyzes the PDL data that has been created by a computer (not shown) and then transmitted through the network and forms band image data.

The memory arbiter 102 arbitrates an access between the main memory 130 and each unit of the CPU provided with a memory controller. The communication controller 106 controls communication through, for example, a network. The bus controller 105 arbitrates connection between the bus 113 and each unit that is connected to the bus 113. The memory controller 103 controls an access to the main memory 130. The CPU I/F 101 controls the communication between the memory arbiter 102 and the CPU 100.

The main memory 130 includes a PDL data area 130A in which PDL data is stored, an image data area 130B in which band image data is stored, and a page code data area 130C in which code data obtained by coding the band image data is stored.

The ASIC 52 for the display controller includes a bus I/F 107 and a display controller 108. The bus I/F 107 controls the communication between the bus 113 and the ASIC 52 for the display controller. The display controller 108 controls the display operation of a display 109 which is, for example, a Liquid Crystal Display (LCD). For example, a display control signal that is generated by the CPU 100 according to a program is supplied to the display controller 108 through, for example, the bus 113. The display controller 108 drives the display 109 on the basis of the supplied display control signal.

The ASIC 53 for the panel controller includes a bus I/F 111 and a panel controller 112. The bus I/F 111 controls the communication between the bus 113 and the ASIC 53 for the panel controller. The panel controller 112 controls an input unit 121. The input unit 121 includes a plurality of manipulanda and a touch panel that outputs a signal corresponding to a pressed position. The touch panel and the display 109 are combined with each other to form an operation panel capable of performing an operation corresponding to display.

Next, the printer 60 will be described. The printer 60 includes a Central Processing Unit (CPU) 61 provided with a memory controller, an Application Specific Integrated Circuit (ASIC) 62 for image processing, an ASIC 63 for a panel controller, a main memory 230, and a ROM 240 that stores programs. The CPU 61 provided with a memory controller, the ASIC 62 for the image processing, and the ASIC 63 for the panel controller can communicate with one another through a bus 213.

The CPU 61 provided with a memory controller includes a CPU 200, a CPU I/F 201, a memory arbiter 202 (abbreviated to MEMORY ARB in the drawings), a memory controller 203, a DMA controller 204 (abbreviated to DMAC in the drawings), a bus controller 205, a communication controller 206, and an interrupt controller 250. The CPU 200 controls the overall operation of the printer 60 according to the programs stored in the ROM 240.

The memory arbiter 202 arbitrates an access between the main memory 230 and each unit of the CPU 61 provided with a memory controller. The communication controller 206 controls communication through the network and the like. The bus controller 205 arbitrates connection between the bus 213 and each unit. The memory controller 203 controls an access to the main memory 230. The CPU I/F 201 controls the communication between the memory arbiter 202 and the CPU 200.

For example, the code data obtained by performing compression coding on image data, which is transmitted from the printer server 50 through the network, is received by the communication controller 206 and is then stored in the main memory 230 through the memory arbiter 202. The printer 60 may use the entire area of the main memory 230 as a page code data area that stores code data for each band in a page unit.

The ASIC 62 for image processing includes a bus I/F 207, a decoding unit 209, and an engine controller 210. The bus I/F 207 controls the communication between the bus 213 and the ASIC 62 for the image processing. The decoding unit 209 decodes the code data read from the main memory 230 into image data and supplies the image data to the engine controller 210. The engine controller 210 controls a printer engine 260 to perform printing on the basis of the image data.

When an error occurs during the decoding of the code data, the decoding unit 209 outputs an error signal indicating the occurrence of the error, which will be described in detail below. The error signal is supplied to the interrupt controller 250 in the CPU 61 provided with a memory controller. When receiving the error signal, the interrupt controller 250 generates an interrupt signal for interrupting the CPU 200 and supplies the interrupt signal to the CPU 200.

An ASIC 64 for a display controller includes a bus I/F 227 and a display controller 228. The bus I/F 227 controls the communication between the bus 213 and the ASIC 64 for the display control. The display controller 228 controls the display operation of a display 229 which is, for example, an LCD. For example, a display control signal that is generated by the CPU 200 according to a program is supplied to the display controller 228 through the bus 213 and the like. The display controller 228 drives the display 229 on the basis of the supplied display control signal.

The ASIC 63 for the panel controller includes a bus I/F 211 and a panel controller 212. The bus I/F 211 controls the communication between the bus 213 and the ASIC 63 for the panel controller. The panel controller 212 controls an input unit 221. The input unit 221 includes a plurality of manipulanda and a touch panel that outputs a signal corresponding to a pressed position. The touch panel and the display 229 are combined with each other to form an operation panel capable of performing an operation corresponding to display.

Figure 2:
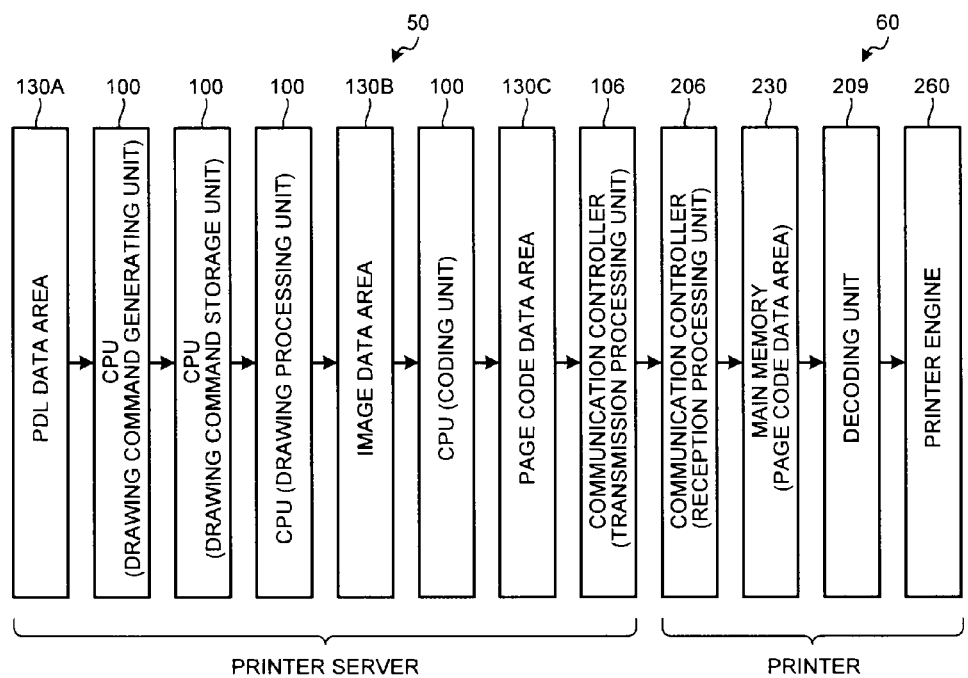
FIG. 2 is a diagram schematically illustrating the overall flow of a process.

FIG. 2 depicts the overall flow of a process. For example, it is assumed that print data (PDL data) generated by a computer (not shown) is stored in the PDL data area 130A of the main memory 130 of the printer server 50. In the printer server 50, a drawing command generating unit, which is one of the modules of the program operated on the CPU 100, analyzes the PDL data stored in the PDL data area 130A and generates a drawing command. The drawing command is stored, for example, in the PDL data area 130A of the main memory 130.

A drawing processing unit, which is one of the modules of the program operated on the CPU 100, receives the drawing command from the PDL data area 130A of the main memory 130 and draws band image data in an image data area 130B of the main memory 130. The band data stored in the image data area 130B of the main memory 130 is coded into code data for each band by a coding unit, which is one of the modules of the program operated on the CPU 100, and the code data is stored in a page code data area 130C of the main memory 130.

The communication controller 106 transmits the code data stored in the page code data area 130C of the main memory 130 in the printer server 50 from the printer server 50 to the printer 60 through the network. The code data is received by the communication controller 206 of the printer 60 and is then stored in the main memory 230. The decoding unit 209 reads the code data for every band, which corresponds to one page, from the main memory 230, decodes the code data into image data, and supplies the image data to the engine controller 210. The engine controller 210 controls the printer engine 260 to perform printing on the basis of the supplied image data.

Regarding Data Flow

Figure 3:
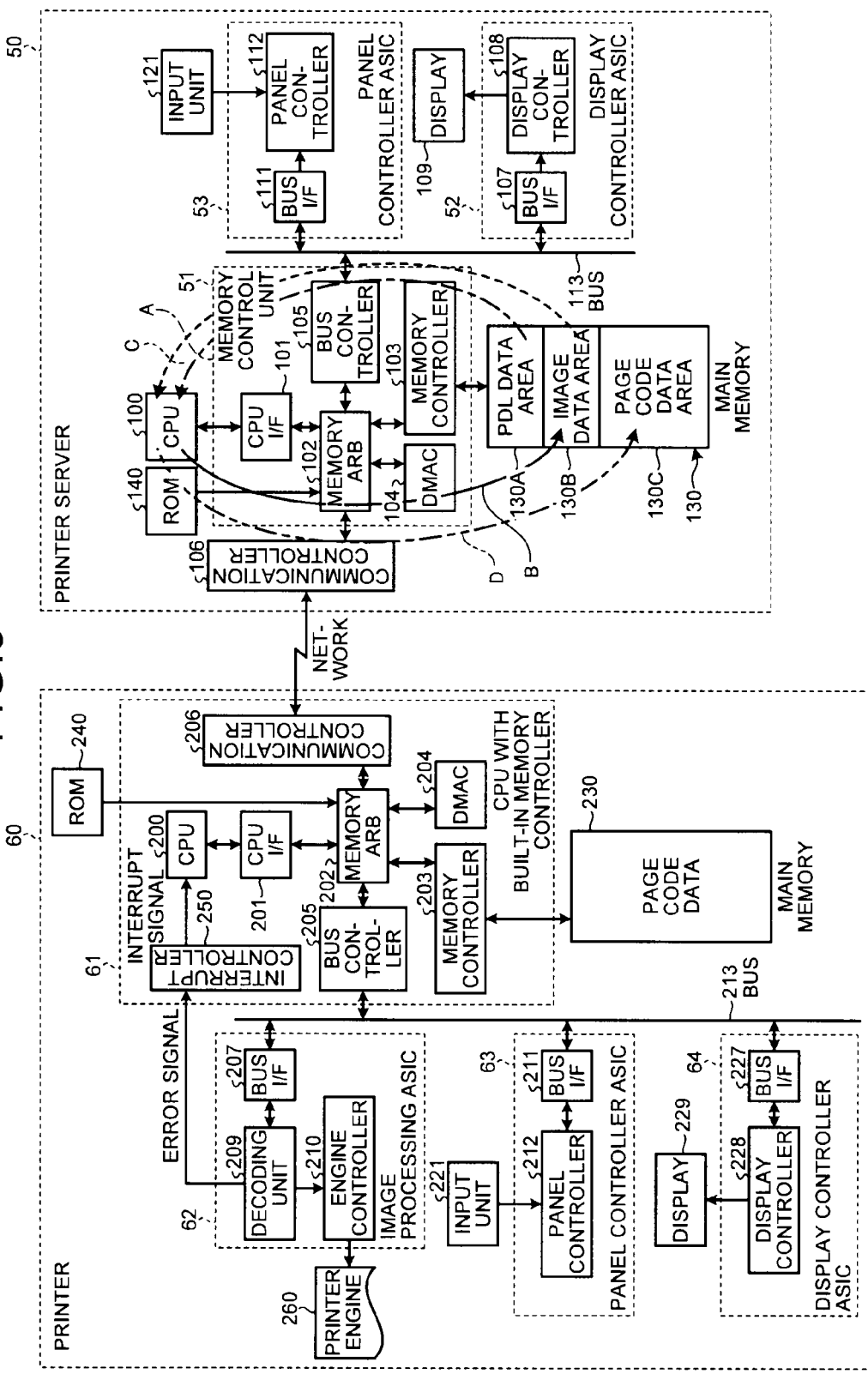
FIG. 3 is a diagram schematically illustrating the flow of data.

Next, the flow of data when the image data is coded and decoded and when an error occurs during decoding will be described with reference to FIGS. 3 to 5. FIG. 3 illustrates an example of the flow of data in an image data coding process. In the following description, it is assumed that the printer server 50 codes the image data. However, the invention is not limited thereto, and the printer 60 may code the image data or a computer that is connected to the printer 60 with a predetermined interface may code the image data. When the printer 60 codes the image data, it is considered that an error hardly occurs in the generated code data. It is assumed that PDL data for forming the image data is stored in the PDL data area 130A of the main memory 130 that is created in advance.

In the printer server 50, the CPU 100 reads the PDL data from the PDL data area 130A of the main memory 130 (path A) and analyzes the read PDL data to generate band image data. In this case, the CPU 100 may perform predetermined image processing, such as a gradation process, on the band image data. The generated band image data is stored in the image data area 130B of the main memory 130 (path B). Subsequently, the CPU 100 reads out the band image data from the image data area 130B and codes the band image data (path C). The process of coding the image data will be described in detail below. The code data obtained by coding the band image data is stored in the page code data area 130C of the main memory 130 (path D).

Figure 4:
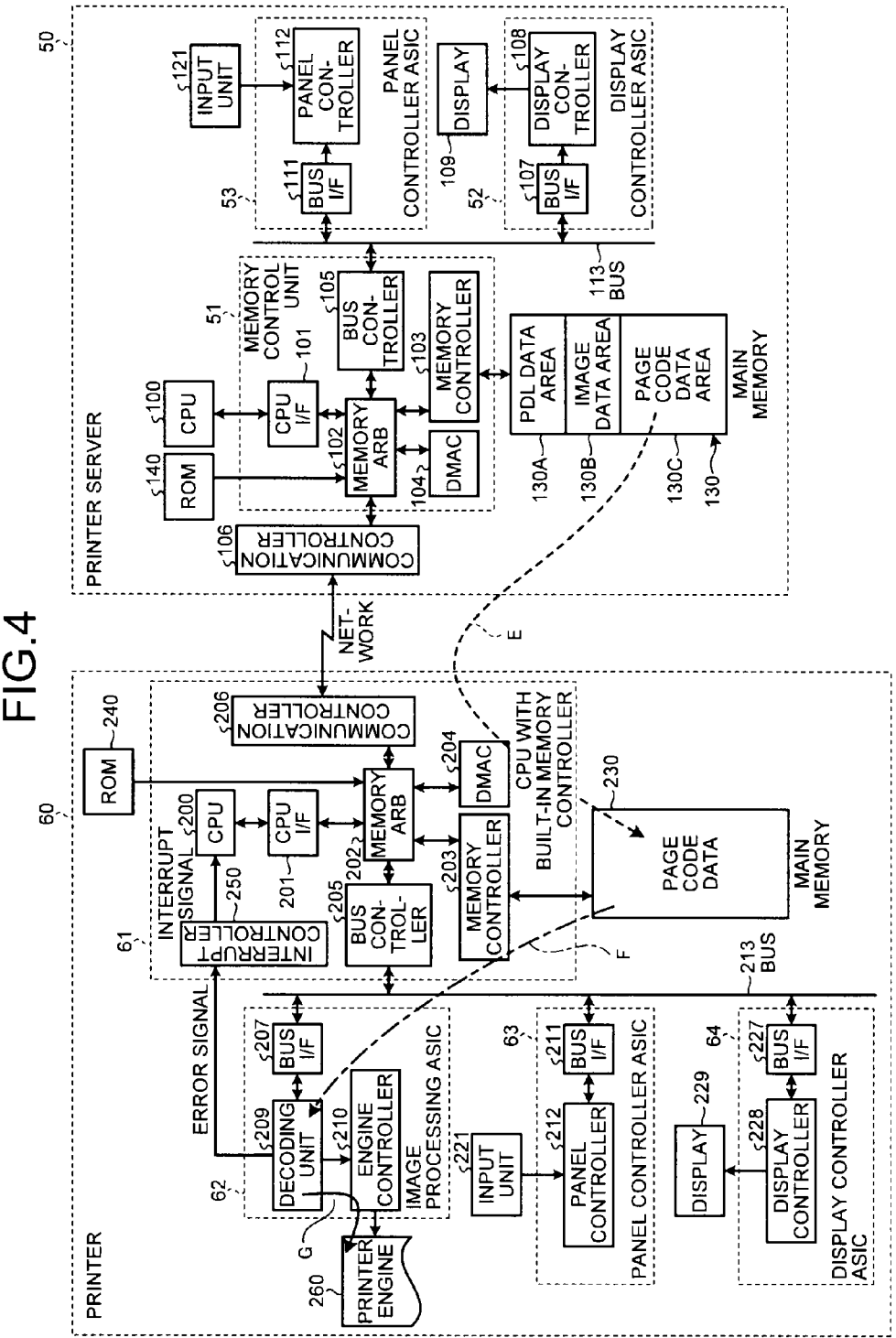
FIG. 4 is a diagram schematically illustrating the flow of data.

FIG. 4 illustrates an example of the flow of data in a code data decoding process. The printer server 50 transmits the code data obtained by coding the image data to the printer 60, and the printer 60 performs the code data decoding process. The printer server 50 reads out code data corresponding to one page from the page code data area 130C of the main memory 130 and transmits the code data to the printer 60 through the network using the communication controller 106. The code data is received by the communication controller 206 of the printer 60 and is then stored in the main memory 230 (path E).

The code data read out from the main memory 230 is transmitted to the decoding unit 209 (path F). The decoding unit 209 decodes the transmitted code data into image data in synchronization with the printer engine 260 and supplies the image data to the engine controller 210 (path G). The engine controller 210 controls the printer engine 260 to perform printing on the basis of the image data.

Figure 5:
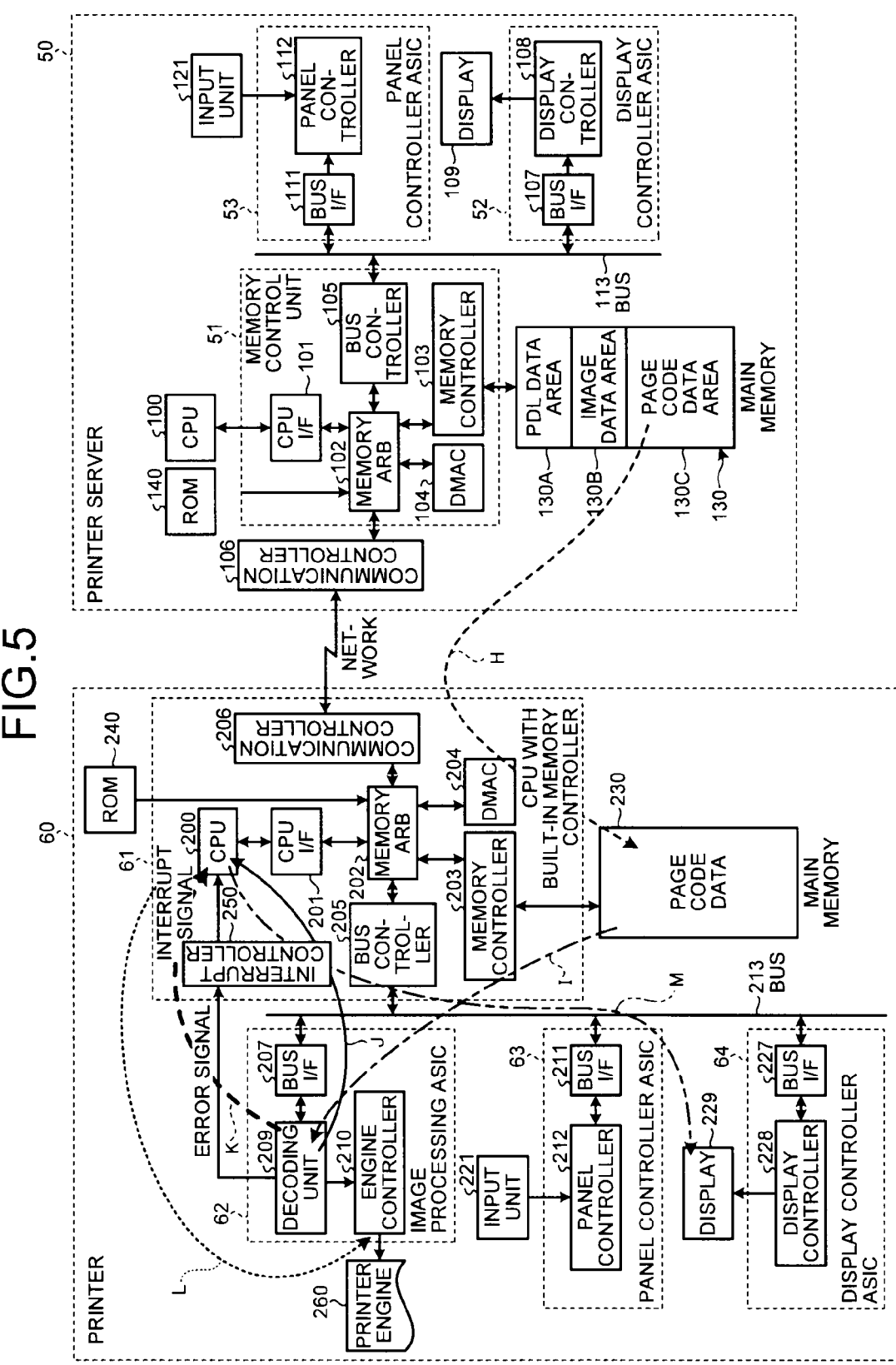
FIG. 5 is a diagram schematically illustrating the flow of data.

FIG. 5 illustrates an example of the flow of data when an error occurs during the decoding process. First, similar to FIG. 4, the code data read out from the page code data area 130C of the main memory 130 in the printer server 50 is transmitted to the printer 60 through the network and is then stored in the main memory 230 of the printer 60 (path H). The decoding unit 209 decodes the code data read out from the main memory 230 (path I). The decoding process will be described in detail below.

The decoding unit 209 detects an error in the code data during the decoding of the code data. When detecting an error in the code data, the decoding unit 209 outputs an error signal indicating the detection of the error, to the to the interrupt controller 250 (path K). When receiving the error signal from the decoding unit 209, the interrupt controller 250 generates an interrupt signal and supplies the interrupt signal to interrupt the process of the CPU 200. When receiving the interrupt signal from the interrupt controller 250, the CPU 200 requests the engine controller 210 to stop the printing operation (path L).

The CPU 200 reads in an error status signal indicating, for example, the kind of detected error from the decoding unit 209 (path J). The CPU 200 displays information indicating the occurrence of the error on the display 229 on the basis of the read in error status signal (path M).

Regarding Coding Process

Next, an image data coding process applicable to this embodiment will be described. In this embodiment, image data is coded by an MTF coding method. As disclosed in Japanese Patent No. 4000266, the MTF coding method performs Move To Front (MTF) control on a small dynamic dictionary to code an index value matched with the dictionary. In the MTF coding method, it is considered that the character which has appeared in the previous stage among the previous characters has the highest probability of appearing in the current stage.

The MTF coding method is performed as follows. A list of all input values is provided, and an input value is compared with the values in the list. A code is generated using the position of the list where there is a value identical to the input value as a symbol. Then, the value compared with the input value is deleted from the list and the input value is arranged at the head of the list.

For example, an example of a character string created by five characters "a," "b," "d," "o," and "Y" will be described. First, a list R={a, b, d, o, Y} of the five characters is made and symbols 0, 1, 2, 3, and 4 are given to the characters. Then, a process of examining each character of an input character string (for example, {Ydbbaaaadoo}), outputting a corresponding symbol of the list, and moving the character to the heat of the list is repeatedly performed until all characters of the input character string are output. Finally, an output string {4, 3, 3, 0, 3, 0, 0, 0, 2, 4, 0} is obtained.

Figure 6:
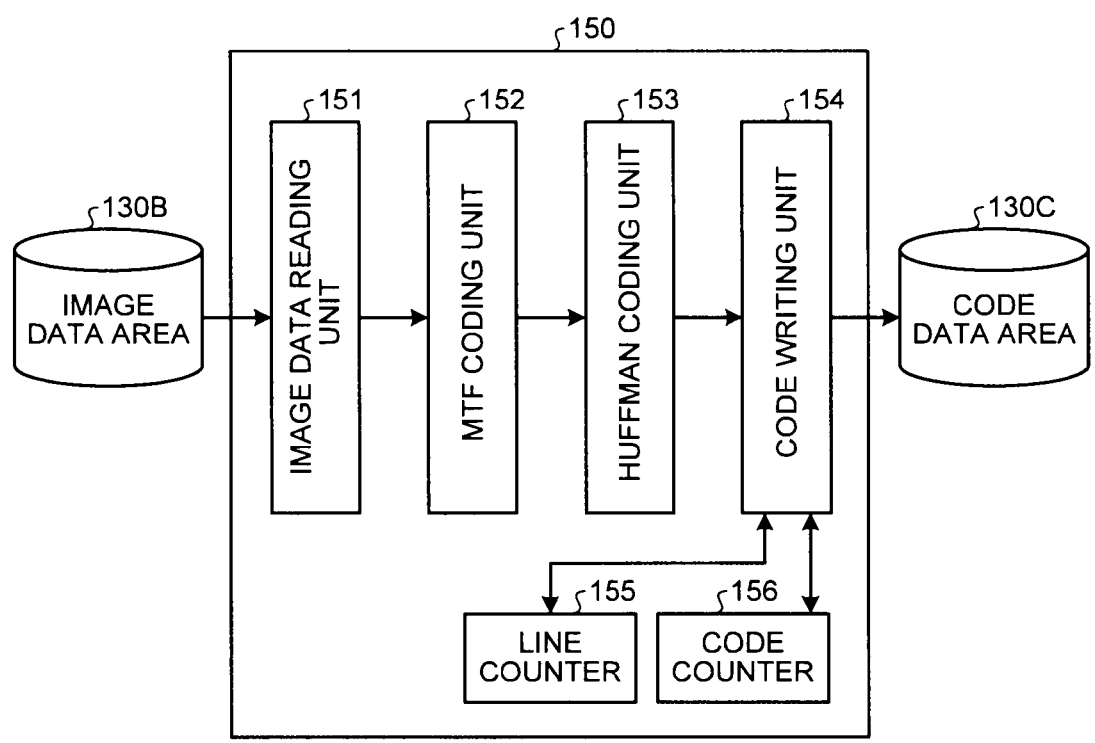
FIG. 6 is a block diagram illustrating the structure of an example of a coding unit.

FIG. 6 illustrates the function of a coding unit 150 that performs coding. The coding unit 150 includes an image data reading unit 151, an MTF coding unit 152, a Huffman coding unit 153, a code writing unit 154, a line counter 155, and a code counter 156. Each of the units included in the coding unit 150 includes, for example, the modules of the program operated on the CPU 100.

Figure 7A:
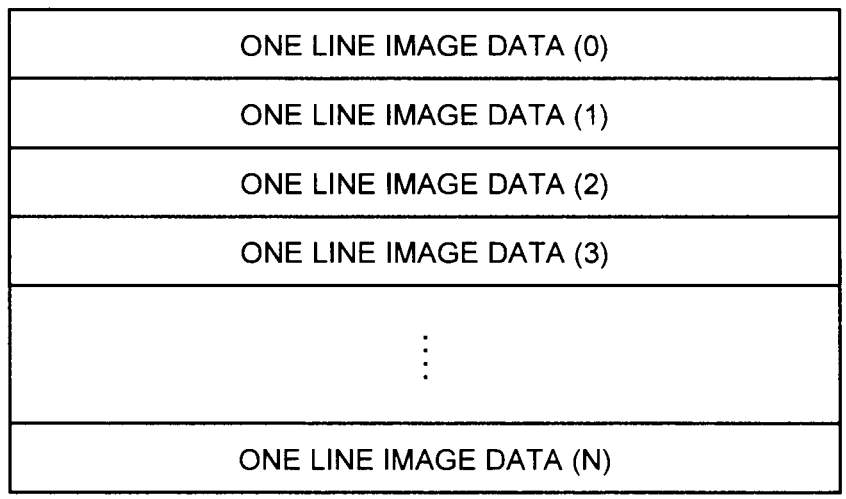
FIGS. 7A and 7B are diagrams schematically illustrating image data and code data.

The image data reading unit 151 reads image data from the image data area 130B of the main memory 130 and transmits the read image data to the MTF coding unit 152. FIG. 7A illustrates an example of the image data to be coded. As such, the coding unit 150 codes image data line. In this example, the MTF coding unit 152 has a dictionary that stores 32 data items, and compares the data read by the image data reading unit 151 with the data in the dictionary using an MTF process. When the read data is identical to the data in the dictionary, the MTF coding unit 152 transmits the index value that is associated with the dictionary data to the Huffman coding unit 153. When the read data is not identical to the data in the dictionary, the MTF coding unit 152 transmits the read data as ESC (escape) data to the Huffman coding unit 153.

The Huffman coding unit 153 performs a Huffman coding process on the index value or the ESC data transmitted from the MTF coding unit 152 using a code buffer (not shown) to generate code data with a variable length and transmits the code data to the code writing unit 154. The code writing unit 154 transmits the code data received from the Huffman coding unit 153 to the main memory 130 through an output code buffer (not shown) of the code writing unit 154 and the code data is stored in the page code data area 130C.

Figure 7B:
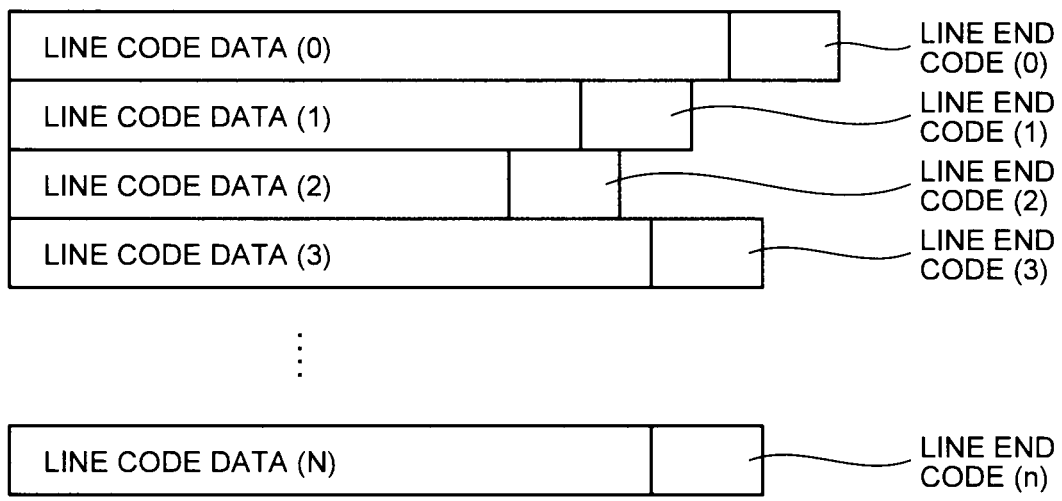

FIG. 7B illustrates an example of the code data obtained by coding the image data shown in FIG. 7A. As such, coding is performed on a line-to-line basis using a variable-length code, and a line end code is arranged following line code data obtained by coding the image data corresponding to one line. For example, the code writing unit 154 transmits an image data code at the end of the line to the main memory 130, generates a line end code, and writes the line end code immediately behind the image data code at the end of the line in the main memory 130.

The line counter 155 counts the number of coded lines. For example, whenever the code writing unit 154 writes the line end code, the line counter 155 increases a count value IY by 1. For example, whenever the code writing unit 154 writes code data corresponding to one word to the main memory 130, the code counter increases a code count value C by 1. The code count value C is cleared at the end of the line.

Figure 8:
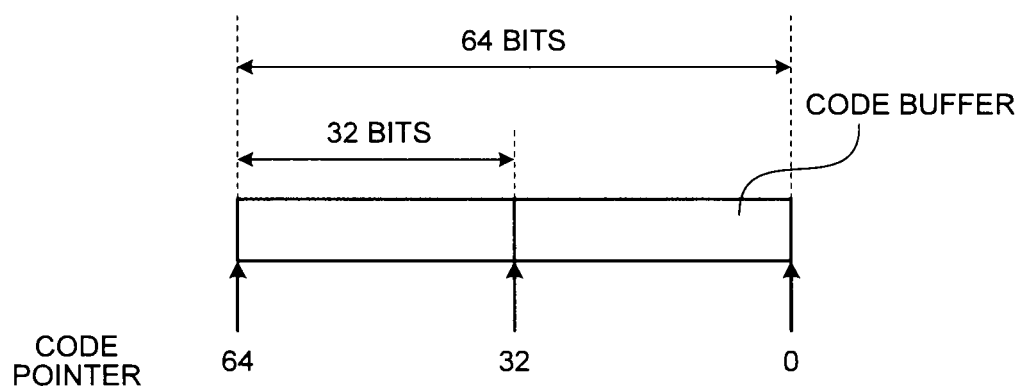
FIG. 8 is a diagram schematically illustrating a code buffer.

As shown in FIG. 8, the code buffer has a capacity corresponding to, for example, two words and stores variable-length code data from the head. The end of valid code data stored in the code buffer is indicated by a code pointer. One word is the unit of data read by one address designating operation. In this embodiment, it is assumed that the one word is 32 bits. Therefore, the code buffer stores 64-bit code data.

FIGS. 9A to 9C illustrate an example of a code format applicable to this embodiment. In the following description, "0b" indicates that a numerical value following "0b" is represented by a binary number.

FIG. 9A illustrates an example of a code table of index codes obtained by coding the index values. A code is associated with each of 32 code names indicating the index values. Two characters at the end of the code name indicate the index value. As the index value is reduced, the frequency of appearance increases and a shorter index code is allocated. The index value indicates the address of the dictionary used in the MTF coding method.

In this embodiment, in order to improve coding efficiency, all codes with a code length of 3 bits (the shortest code length) to 9 bits are used for 29 index values "00" to "28" according to a Huffman tree. Codes with a code length of 12 bits are sequentially allocated to the remaining three index values "29" to "31" in ascending order of code values. When the line end code with a code length of 12 bits is also considered, four codes (0b111111111011 to 0b111111111110) among the codes with a code length of 12 bits are absent in the code table according to the Huffman tree.

The code table shown in FIG. 9A is stored as an index code table in, for example, the ROM 140 in advance. That is, the index code table is stored such that the code name (index value), the index code, and the code length are associated with each other. During a coding process, the Huffman coding unit 153 reads the index code table from the ROM 140 and codes the index code table.

FIG. 9B illustrates an example of the code format of ESC data. The ESC data is used when no data value is in the dictionary and the data value is applied without any change. In this example, since the ESC data is coded into 16-bit data, the ESC data has a code length of 16 bits. An ESC header with a code length of 3 bits is added to the head of the ESC data.

FIG. 9C illustrates an example of the line end code. The line end code includes 12 consecutive binary numbers "1" and is used to determine the end of the line in the code data. Since the frequency of appearance is low, a long code length is allocated.

Figure 10:
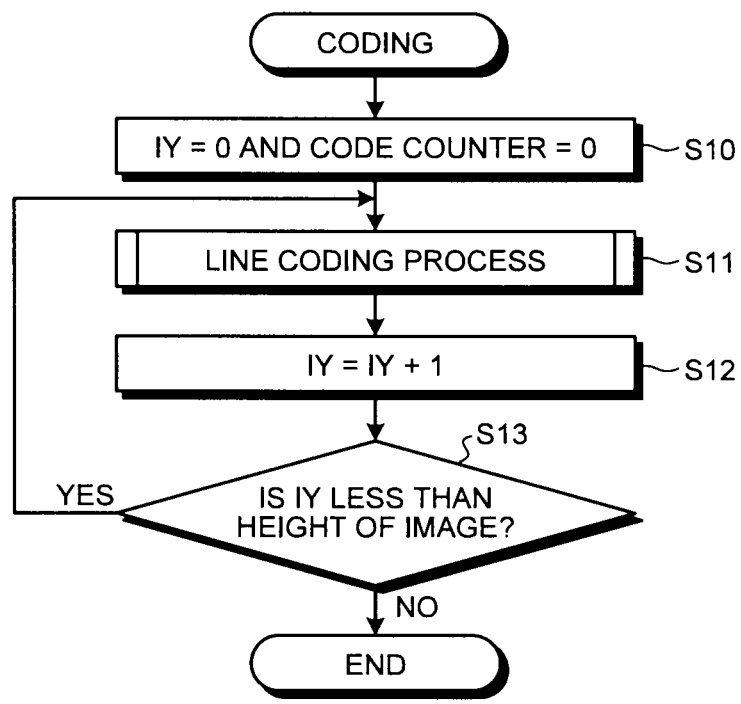
FIG. 10 is a flowchart illustrating an example of the overall flow of a coding process.

Next, a coding method applicable to this embodiment will be described with reference to FIGS. 10 to 19. FIG. 10 is a flowchart illustrating an example of the overall flow of a coding process. In Step S10, the count value IY of the line counter 155 and the code count value C of the code counter 156 are cleared to "0." In Step S11, coding is performed on a line-to-line basis. When coding for one line ends, the count value IY of the processed line is increased by 1 in Step S12. Then, in Step S13, it is determined whether the count value IY is processed at the height of the image. When it is determined that the count value IY is processed at the height of the image, the process ends. When it is determined that the process does not end, the process returns to Step S11.

Figure 11:
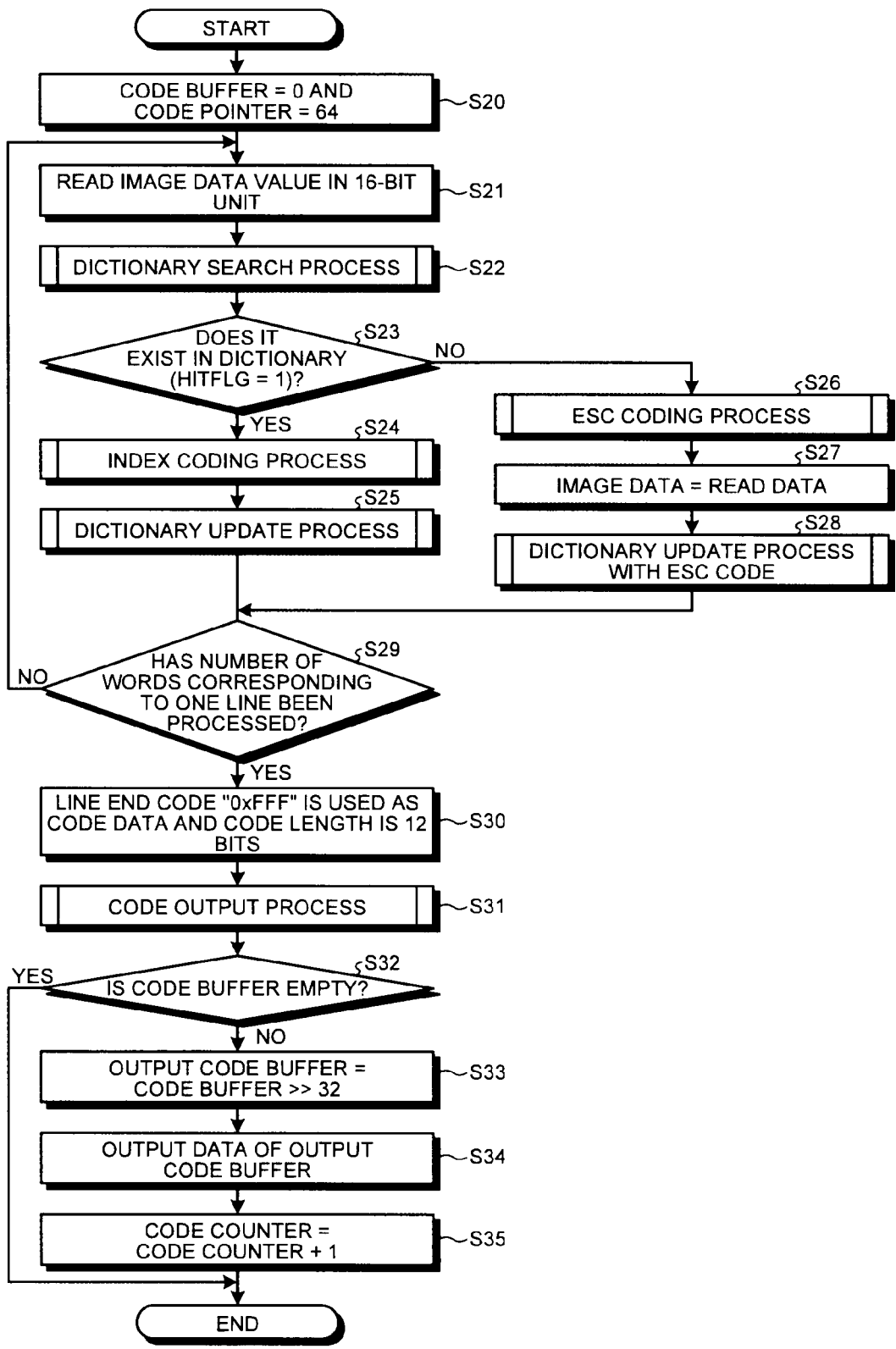
FIG. 11 is a flowchart illustrating an example of the coding process on a line-to-line basis.

FIG. 11 is a flowchart illustrating an example of the coding process on a line-to-line basis in Step S11 of FIG. 10. In Step S20, the code buffer is set to 0, that is, the code buffer is initialized to zero, and the pointer value of the code buffer is initialized to 64 bits.

In Step S21, the image data reading unit 151 reads image data from the main memory 130 in the unit of 16 bits and transmits the image data to the MTF coding unit 152. In Step S22, the MTF coding unit 152 searches for dictionary data identical to the read image data.

Figure 12:
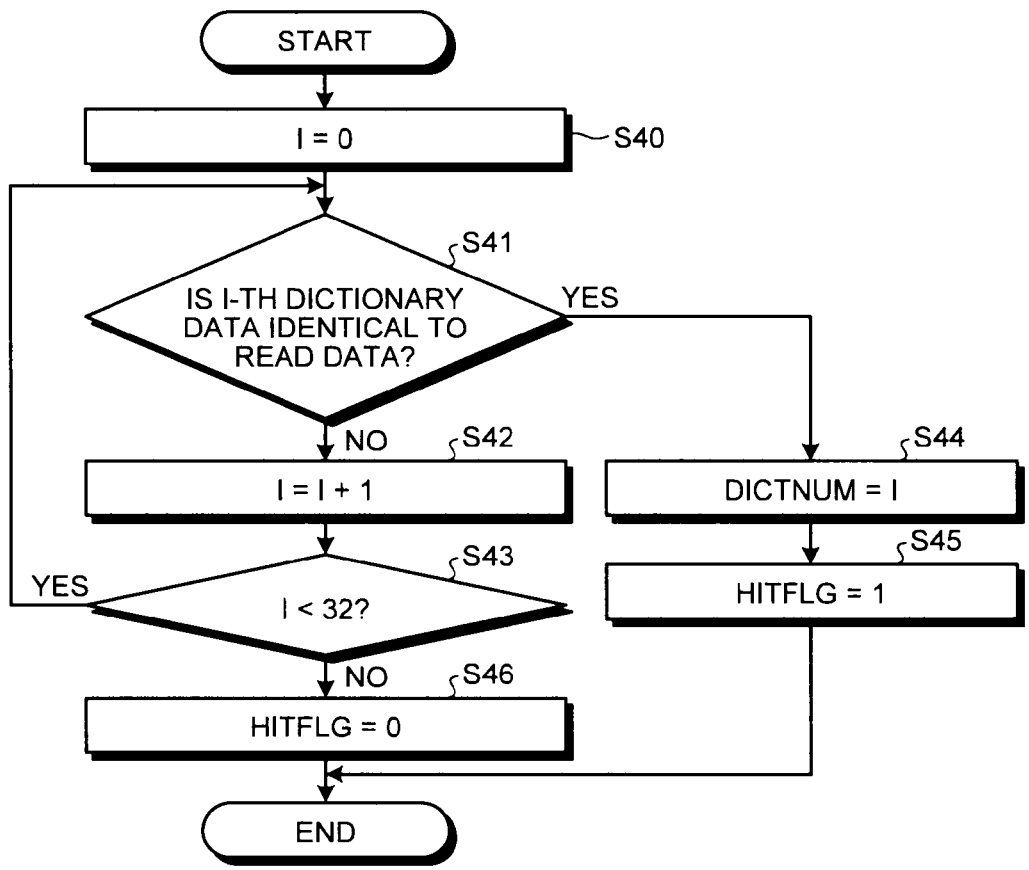
FIG. 12 is a flowchart illustrating an example of a dictionary search process.

FIG. 12 is a flowchart illustrating an example of the dictionary search process in Step S22. In Step S40, the MTF coding unit 152 sets an index value I to 0. In Step S41, the MTF coding unit 152 determines whether I-th dictionary data is identical to the image data read in Step S21 of FIG. 11. When the I-th dictionary data is not identical to the read image data, the index value I is increased by 1 in Step S42. In Step S43, it is determined whether the index value I is less than 32. When it is determined that the index value I is less than 32, the process returns to Step S41.

In Step S43, when it is determined that the index value I is equal to or more than 32, the process proceeds to Step S46 and the value of a flag HITFLG is set to 0. Then, a series of processes in the flowchart of FIG. 12 ends, and the process proceeds to Step S23 in the flowchart of FIG. 11.

When the MTF coding unit 152 determines that the I-th dictionary data is identical to the read image data in Step S41, the process proceeds to Step S44 and the index value I is used as a value DICTNUM. In Step S45, the value of the flag HITFLG is set to 1.

Next, a dictionary search will be described in detail with reference to FIG. 13. For example, the value of the read image data is "0x5555" and the MTF coding unit 152 searches for the value "0x5555" of the dictionary data identical to the value of the read image data from the dictionary. In this example, as a result of the search, since it is confirmed that the value of the read image data is identical to fourteenth dictionary data, the index value is "14." The index value "14" is output from the MTF coding unit 152. When there is dictionary data identical to the read image data, the MTF coding unit 152 sets the flag HITFLG to 1. When there is no value identical to the value of the read image data in the dictionary, the MTF coding unit 152 sets the flag HITFLG to 0.

Returning to the flowchart shown in FIG. 11, when the dictionary search in Step S22 ends, in Step S23, it is determined whether there is dictionary data identical to input image data on the basis of the flag HITFLG. When the flag HITFLG is 1 and it is determined that there is dictionary data identical to the input image data, the process proceeds to Step S24.

In Step S24, the index value is output from the MTF coding unit 152 and is then transmitted to the Huffman coding unit 153. The Huffman coding unit 153 codes the index value transmitted from the MTF coding unit 152 according to the code format described with reference to FIGS. 9A to 9C. The code data is stored in the code buffer.

Figure 14:
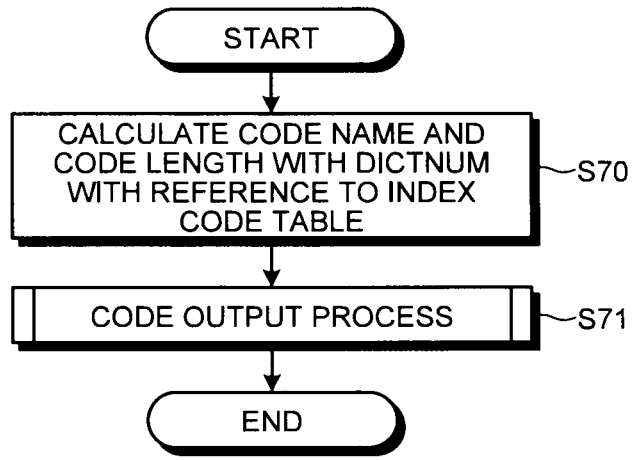
FIG. 14 is a flowchart illustrating an example of an index coding process.

FIG. 14 is a flowchart illustrating an example of the index coding process in Step S24. In Step S70, the Huffman coding unit 153 refers to the code name of the index code table with the value "DICTNUM" on the basis of the code format shown in FIG. 9A, calculates an index code corresponding to the referred code name as code data, and calculates a code length corresponding to the code name. In a code output process in Step S71, the code data is output using the code data and the code length. The code output process will be described in detail below.

Figure 15:
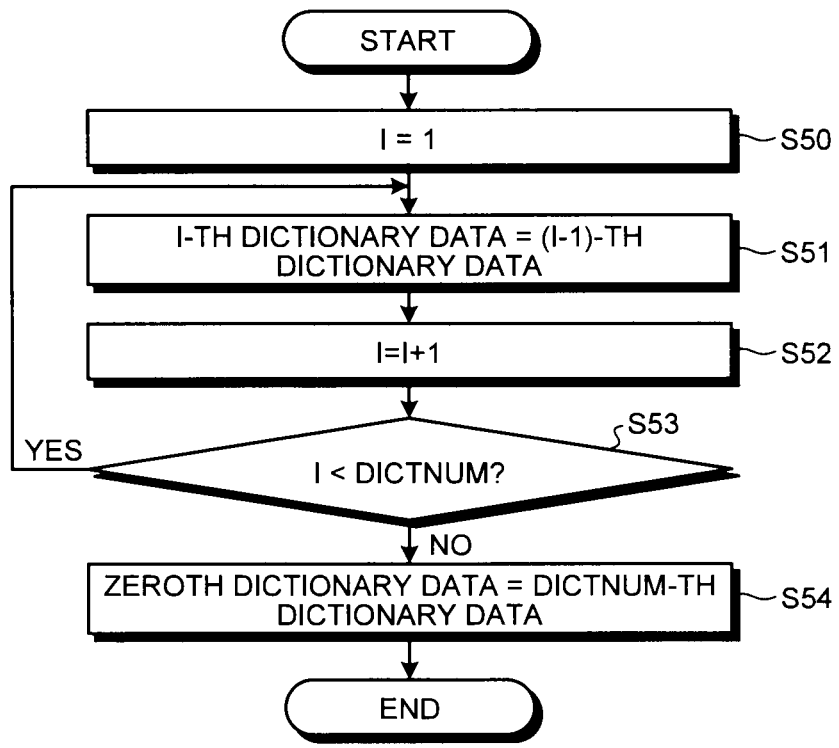
FIG. 15 is a flowchart illustrating an example of a dictionary update process.

Returning to explanation of the flowchart shown in FIG. 11: when the index coding process in Step S24 ends, the process proceeds to Step S25. In Step S25, the MTF coding unit 152 updates the dictionary. FIG. 15 is a flowchart illustrating an example of the dictionary update process in Step S25. The MTF coding unit 152 sets the index value I to 1 in Step S50, uses (I–1)-th dictionary data as I-th dictionary data in Step S51, and increases the index value I by 1 in Step S52. Then, in Step S53, the MTF coding unit 152 determines whether the index value I is less than the value DICTNUM. When it is determined that the index value I is less than the value DICTNUM, the process returns to Step S51. On the other hand, when the index value I is equal to or more than the value DICTNUM, the process proceeds to Step S54 and uses the dictionary data indicated by the value DICTNUM as zeroth dictionary data. When Step S54 ends, a series of processes in the flowchart of FIG. 15 ends and the process proceeds to Step S29 in FIG. 11.

Figure 16:
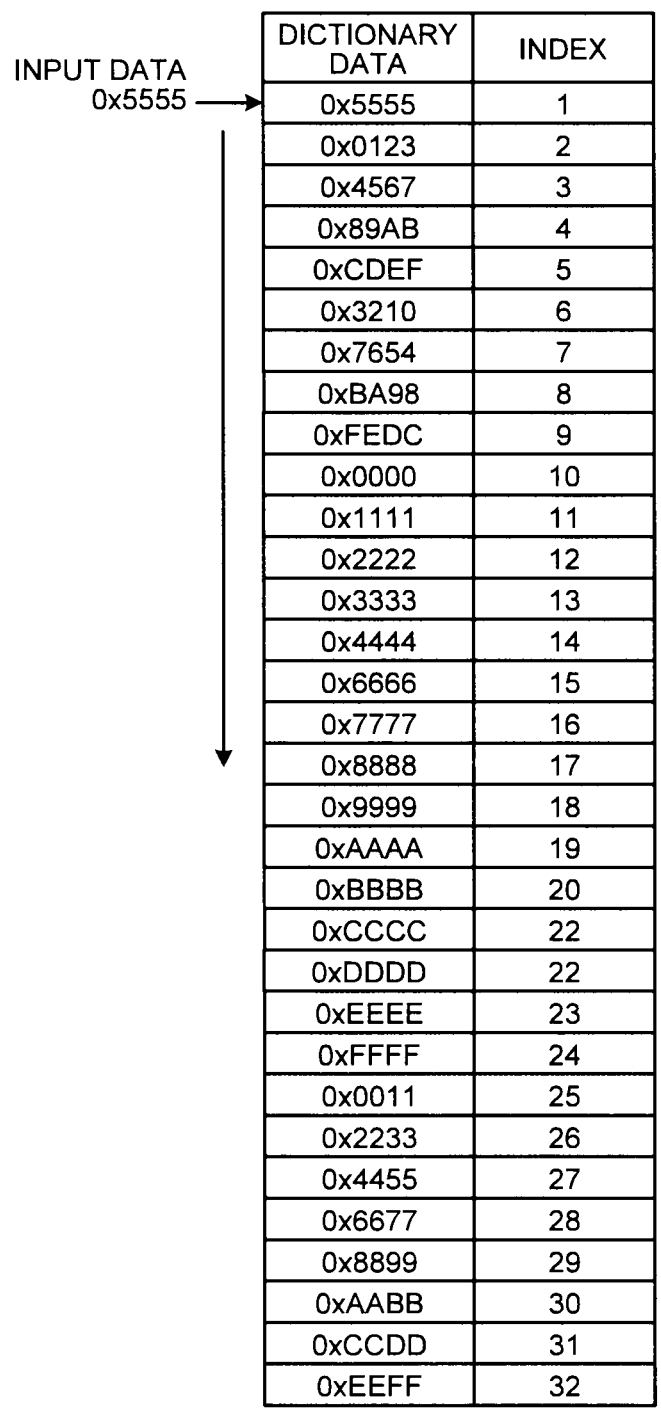
FIG. 16 is a diagram illustrating the dictionary update process in detail.

Next, the dictionary update process will be described in detail with reference to FIG. 16. The MTF coding unit 152 moves the dictionary data whose value is identical to the value of the read image data to the head of the dictionary and sequentially moves back the other dictionary data items in the dictionary to update the dictionary. In this example, since the read image data is identical to the fourteenth dictionary data, the first to fourteenth dictionary data items in the dictionary are moved back one by one and the read image data is stored in the zeroth dictionary.

Returning to explanation of the flowchart shown in FIG. 11: when it is determined that there is no dictionary data identical to the input image data in Step S23, the process proceeds to Step S26. In Step S26, the MTF coding unit 152 performs an ESC coding process on the input image data. In the ESC coding process, the input image data is used as a code without any change to generate an ESC code.

Figure 17:
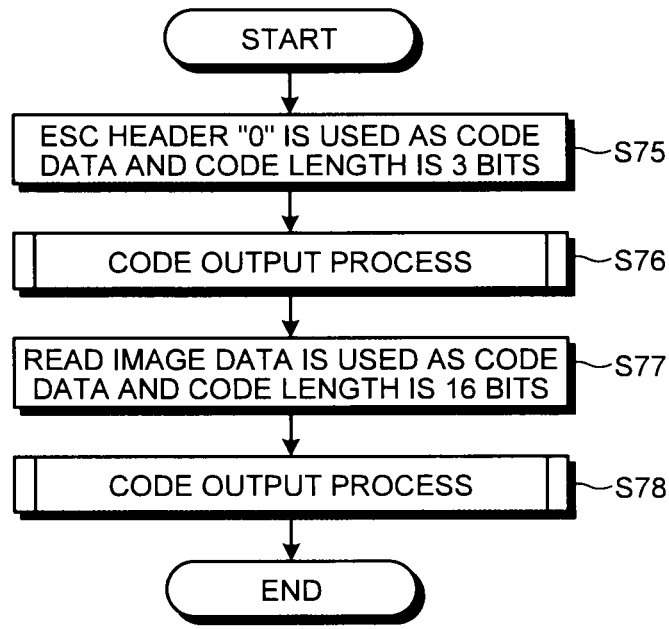
FIG. 17 is a flowchart illustrating an example of an ESC coding process.

FIG. 17 is a flowchart illustrating an example of the ESC coding process in Step S26. The MTF coding unit 152 uses the value 0 of the ESC header as code data with a code length of 3 bits in Step S75 and outputs the code data using the code data and the code length in the code output process of Step S76. In Step S77, the MTF coding unit 152 uses the image data read in Step S21 as the code data and sets the code length to 16 bits. In the code output process of Step S78, the MTF coding unit 152 outputs the code data using the code data and the code length. The code output process in Step S76 and Step S78 will be described in detail below.

Returning to explanation of the flowchart shown in FIG. 11, when the ESC coding process is performed in Step S26, the process proceeds to Step S27 and the data read in Step S21 is used as the image data. In Step S28, the dictionary update process using the ESC code is performed.

Figure 18:
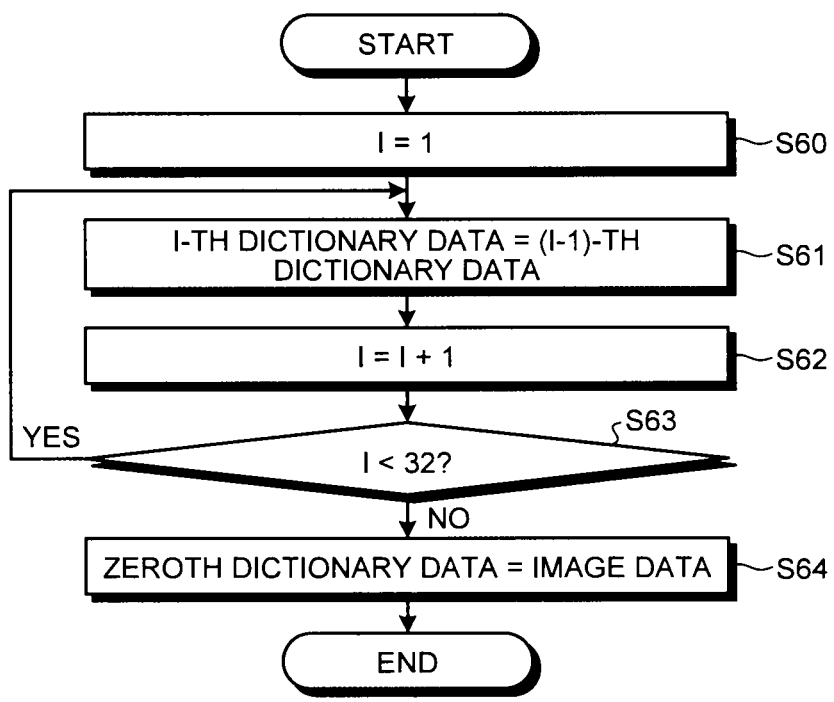
FIG. 18 is a flowchart illustrating an example of the dictionary update process using an ESC code.

FIG. 18 is a flowchart illustrating an example of the dictionary update process using the ESC code in Step S28. The MTF coding unit 152 sets the index value I to 1 in Step S60, uses the (I–1)-th dictionary data as the I-th dictionary data in Step S61, and increases the index value I by 1 in Step S62. Then, in Step S63, the MTF coding unit 152 determines whether the index value I is less than 32. When it is determined that the index value I is less than 32, the process returns to Step S61. On the other hand, when it is determined that the index value I is equal to or more than 32, the process proceeds to Step S64 and the zeroth dictionary data is used as the image data. When Step S64 ends, a series of processes in the flowchart of FIG. 18 ends and the process proceeds to Step S29 in FIG. 11.

Returning to explanation of the flowchart shown in FIG. 11, when the dictionary update process in Step S25 or the ESC dictionary update process in Step S28 ends, the process proceeds to Step S29 and it is determined whether the number of words corresponding to one line has been processed. When it is determined that the number of words corresponding to one line has not been processed yet, the process returns to Step S21, the number of words corresponding to the next line is processed.

Meanwhile, when it is determined that the number of words corresponding to one line has been processed, the process proceeds to Step S30. In Step S30, the Huffman coding unit 153 codes the line end code. That is, a value "0xFFF" (=value "0b111111111111") is used as the code data of the line end code and the code length is 12 bits. In Step S31, the line end code output process is performed. The code output process will be described below.

In Step S32, it is determined whether the code buffer is empty. When it is determined that the code buffer is empty, a series of coding processes in the flowchart of FIG. 11 ends. On the other hand, when it is determined that the code buffer is not empty, the process proceeds to Step S33. In Step S33, the code data in the code buffer is shifted by 32 bits to the right and is then stored in the output code buffer. In Step S34, the code data in the output code buffer is output. In Step S35, the code count value C is increased by 1. In this way, a series of processes in the flowchart of FIG. 11 ends.

Figure 19:
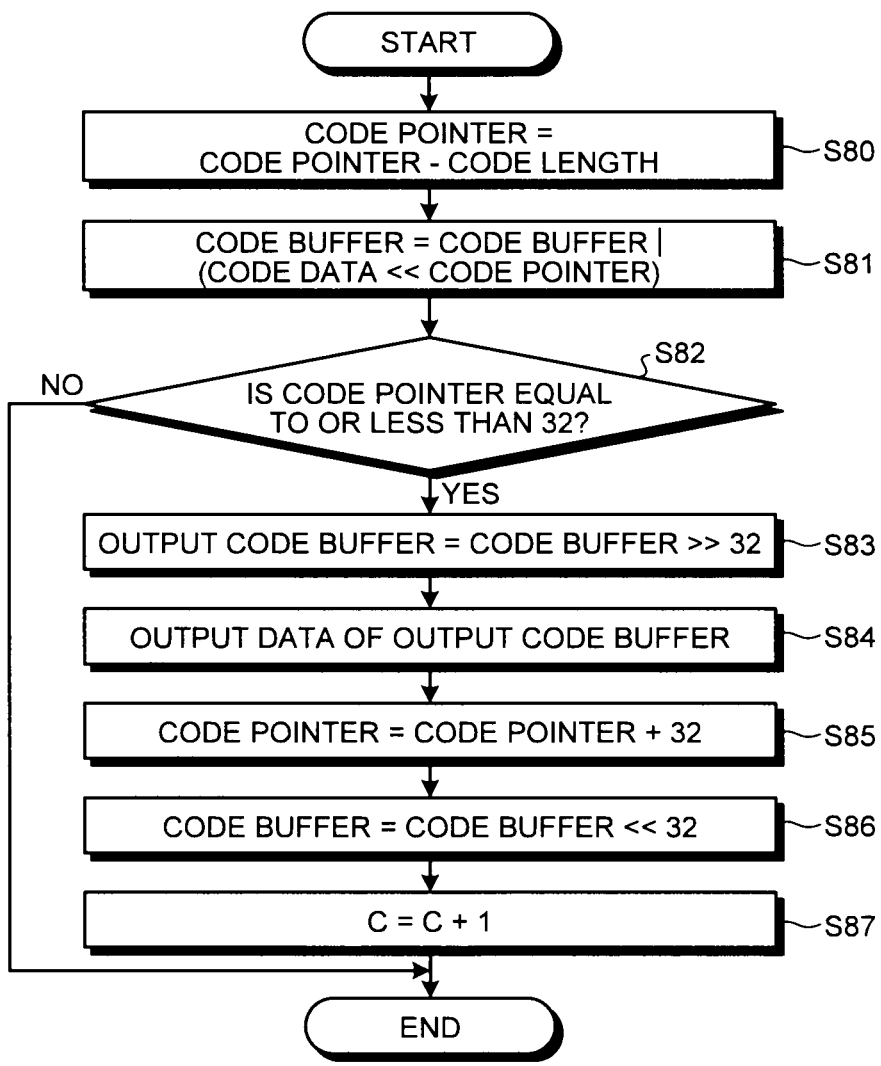
FIG. 19 is a flowchart illustrating an example of a code output process.

FIG. 19 is a flowchart illustrating an example of the code output process in Step S31, Step S71, Step S76, and Step S78. The code output process puts the variable-length code data together into a word size (in this example, 32 bits) and outputs the code data. The code buffer is 64 bits and sequentially adds the variable-length code data. A code pointer indicates the end of a valid code in the code buffer.

In Step S80, the Huffman coding unit 153 uses a value obtained by subtracting the code length from the code pointer as the code pointer. That is, in order to add the code data to the code buffer, a portion of the code pointer corresponding to the code length is updated. In Step S81, the code data is moved with the code pointer, is positioned, and is then added to the code buffer. In Step S82, it is determined whether the value of the code pointer is equal to or less than 32. When it is determined that the value of the code pointer is more than 32, the code output process ends. A series of processes in the flowchart of FIG. 19 ends.

On the other hand, when it is determined that the value of the code pointer is equal to or less than 32, the most significant 32 bits of the code buffer are output in Steps S83 to S87. That is, in Step S83, the code buffer is shifted 32 bits to the right and is then output to the output code buffer. In Step S84, the content of the output code buffer is output. In Step S85, 32 is added to the code pointer. In Step S86, the code buffer is shifted 32 bits to the left. In Step S87, the code count value C is increased by 1. In this way, a series of processes in the flowchart of FIG. 19 ends.

Decoding Process

Next, the decoding process according to this embodiment will be described. In this embodiment, the printer 60 detects whether there is an error in the code data during the decoding process. When an error is detected, the printer interrupts the CPU 200 to stop the printing operation. For example, when the code data to be decoded is a code that cannot be in the code table, it is detected that there is an error in the code data.

During the decoding of code data in a predetermined range, when the amount of decoding is different from a predetermined amount of decoding, it is detected that there is an error. For example, when the predetermined range is one line, the amount of decoding is the number of pixels, and the number of pixels of one line in the image obtained by decoding the code data is not equal to a predetermined number of horizontal pixels, it is determined that there is an error. For example, when the predetermined range is one page, the amount of decoding is a decoded code length in one page, and the code length of one page is not equal to a predetermined code length, it is determined that there is an error.

Figure 20:
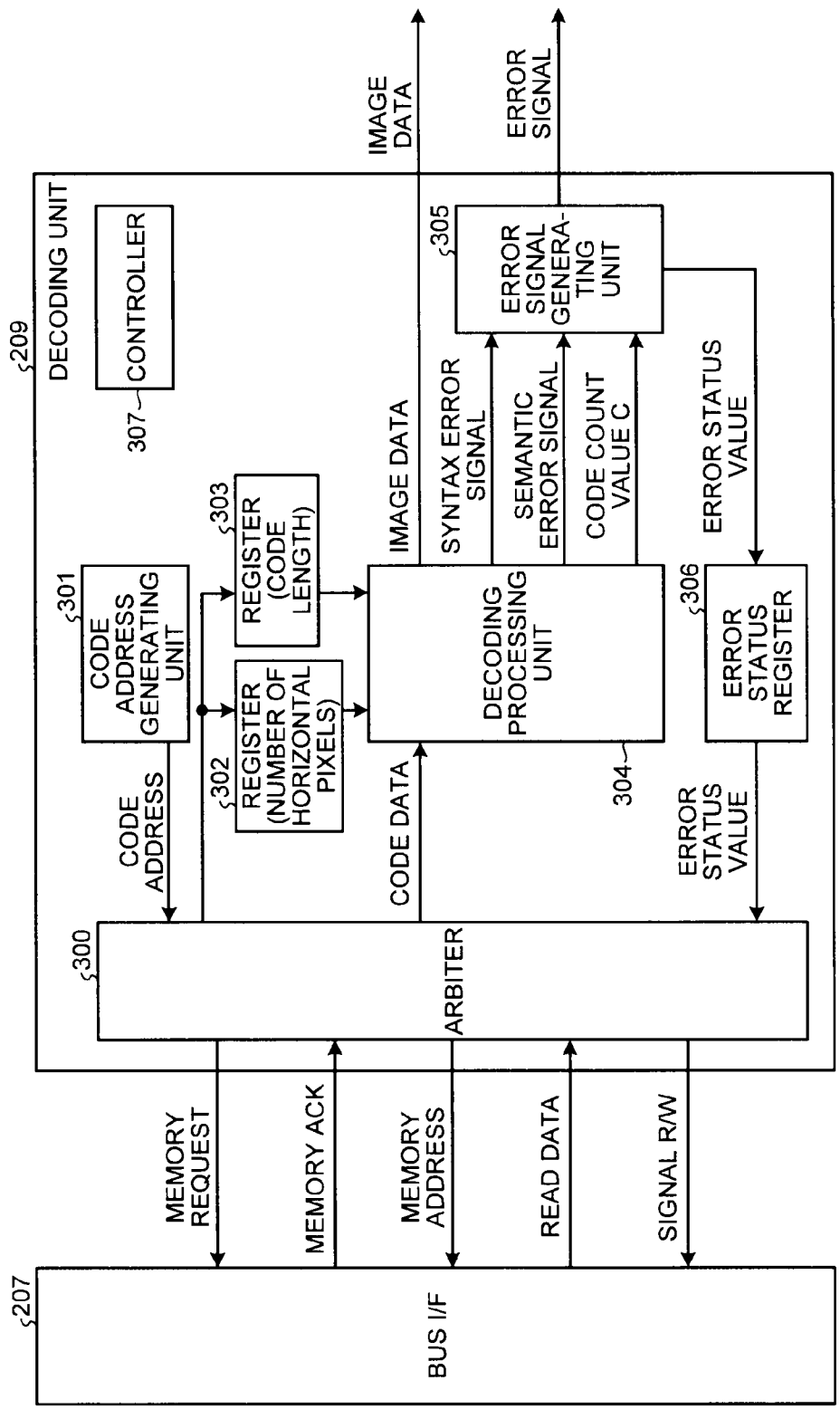
FIG. 20 is a block diagram illustrating the structure of an example of a decoding unit applicable to this embodiment.

FIG. 20 is a diagram illustrating the structure of an example of the decoding unit 209 applicable to this embodiment. The decoding unit 209 includes an arbiter 300, a code address generating unit 301, registers 302 and 303, a decoding processing unit 304, an error signal generating unit 305, an error status register 306, and a controller 307. The controller 307 is, for example, a microprocessor and controls the operation of each unit of the decoding unit 209 according to the program that is stored in a ROM (not shown) in advance.

The arbiter 300 is connected to the bus 213 via the bus I/F 207 and arbitrates the reading of the code data that comes from the main memory 230. The code address generating unit 301 generates an address for reading out the code data of the page stored in the main memory 230.

For example, when the decoding unit 209 makes requests that the main memory 230 reads out the code data, the controller 307 controls the exchange of a memory request and a memory ACK between the arbiter 300 and the bus I/F 207. Subsequently, a memory address generated by the code address generating unit 301 and an R/W signal that instructs reading are transmitted from the arbiter 300 to the memory controller 203 through, for example, the bus I/F 207 and the bus 213. The memory controller 203 reads the code data from the main memory 230 in accordance with the received memory address and R/W signal. The read out code data is transmitted to the decoding unit 209 through, for example, the memory controller 203 and the bus 213 and then transmitted as read data to the arbiter 300.

The decoding processing unit 304 receives the code data which is read out from the main memory 230 according to the address generated by the code address generating unit 301 from the arbiter 300 and decodes the received code data into image data. The decoded image data is output to the engine controller 210.

The controller 307 acquires the number of horizontal pixels of the image data to be printed. For example, the number of horizontal pixels can be acquired on the basis of the information of a sheet size, a print direction (the direction of the sheet), and print resolution included in print attribute data transmitted from the printer server 50 through the network. In addition, the controller 307 acquires the length of a code corresponding to one page for each word from the size of the code data stored in the main memory 230. The code length may be transmitted from the printer server 50 to the printer 60 through the network. The controller 307 stores the number of horizontal pixels and the code length in the registers 302 and 303, respectively.

During the code data decoding process, the decoding processing unit 304 detects an error in the code data that is decoded, on the basis of the number of horizontal pixels and the code length stored in the registers 302 and 303. Here, a syntax error, which is an error in the format of the code data, and a semantic error occurring in the decoding result of the code data are detected. When the syntax error or the semantic error is detected, the decoding processing unit 304 outputs a syntax error signal or a semantic error signal indicating that the error has been detected.

When the code data is read from the main memory 230, the decoding processing unit 304 increases the code count value C by 1. When an error in the code data is detected, the decoding processing unit 304 outputs the code count value C. The syntax error signal, the semantic error signal, and the code count value are supplied to the error signal generating unit 305.

When the syntax error signal or the semantic error signal is supplied from the decoding processing unit 304, the error signal generating unit 305 outputs an error signal indicating the occurrence of a code error to the interrupt controller 250 to interrupt the CPU 200. In addition, the error signal generating unit 305 stores an error status value indicating the status of the detected error in the error status register 306. For example, when the CPU 200 accesses the decoding unit 209 in response to the error signal, the error status value stored in the error status register 306 returns to the CPU 200.

Figure 21:
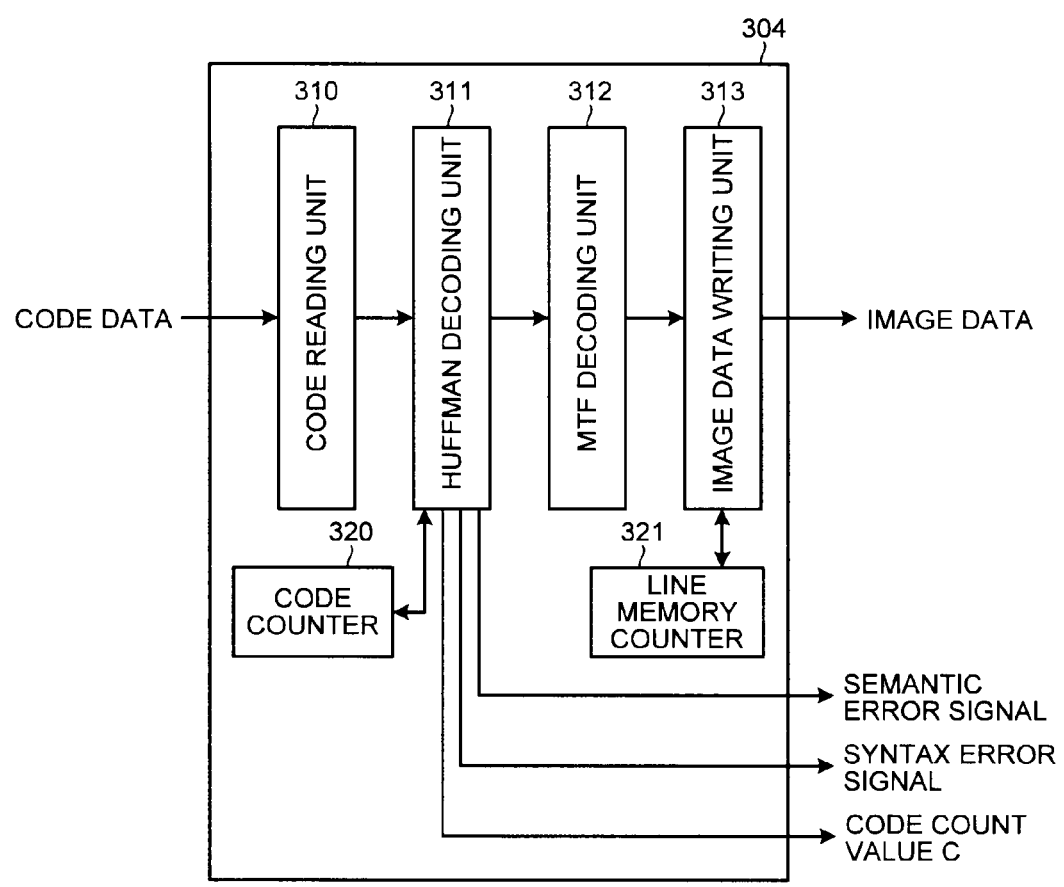
FIG. 21 is a block diagram illustrating the structure of an example of the decoding unit.

FIG. 21 illustrates the structure of an example of the decoding processing unit 304. A code reading unit 310 reads out the code data from the main memory 230 via, for example, the arbiter 300 and the bus I/F 207. The reading out of the code data from the main memory 230 is performed in a word unit. The code data read out from the main memory 230 is transmitted to a Huffman decoding unit 311 and is then stored in the input code buffer (not shown). The Huffman decoding unit 311 decodes the Huffman code of the code data transmitted from the code reading unit 310 using a code buffer (not shown) and transmits the decoded data to an MTF decoding unit 312. The code buffer has the same structure as that shown in FIG. 8 and thus a description thereof will be omitted.

In this example, the MTF decoding unit 312 has a dictionary that stores 32 data items. When the decoded data transmitted from the Huffman decoding unit 311 is an index value, the MTF decoding unit 312 reads the dictionary using the decoded index value, calculates image data using an MTF process, and transmits the image data to an image data writing unit 313. In addition, when the decoded data transmitted from the Huffman decoding unit 311 is ESC data, the MTF decoding unit 312 directly transmits the decoded data to the image data writing unit 313. The image data writing unit 313 temporarily stores the image data transmitted from the MTF decoding unit 312 in the line memory (not shown) and outputs the image data for each line to the engine controller 210.

When the code data of one word read from the main memory 230 is stored in the input code buffer, a code counter 320 increases the code count value C by 1. In other words, the code count value C indicates the address of the code data in the main memory 230. When the code count value C cumulatively increases within one page, it is possible to acquire the length of the decoded code data corresponding to one page.

A line memory counter 321 counts the image data of each pixel which is written to the line memory of the image data writing unit 313 and outputs a count value LM.

During the decoding of the code data, the Huffman decoding unit 311 detects the semantic error and the syntax error in the code data on the basis of the number of horizontal pixels and the code length stored in the registers 302 and 303. When the semantic error is detected from the code data, the Huffman decoding unit 311 outputs a semantic error signal indicating the occurrence of the semantic error. Similarly, when the syntax error is detected from the code data, the Huffman decoding unit 311 outputs a syntax error signal indicating the occurrence of the syntax error. In addition, when the semantic error or the syntax error is detected, the Huffman decoding unit 311 outputs the code count value C.

For Error Detecting Process

Next, a process of detecting an error in the code data according to this embodiment will be described. As described above, the syntax error in the code and the semantic error in the decoding result are detected.

First, the detection of the syntax error will be described with reference to FIG. 22. FIG. 22 illustrates the correspondence between all codes with a code length of 3 bits to 12 bits according to the Huffman tree, and the code length and code name thereof in the code table shown in FIG. 9A. The codes shown in FIG. 22 include an ESC header with a code length of 3 bits in the ESC code, codes corresponding to index values "0" to "31," and the line end code. Among the codes shown in FIG. 22, no valid value is allocated to four codes "0b111111111011" to "0b111111111110."

During decoding, 12 bits from the head of the code that is not decoded are cut, the values of 12 bits are sequentially determined from the head of the code, and a reverse code table, which is the reverse conversion of the code table, is referred to acquire a corresponding code name. FIG. 23 illustrates an example of the reverse code table corresponding to the code table shown in FIG. 9A. The code name and the code length are associated with the codes based on the Huffman codes with a code length of 3 bits to 12 bits. The reverse code table is stored as an index reverse code table in, for example, a ROM (not shown) of the MTF decoding unit 312 in advance. The ESC header and the line end code may be included in the index reverse code table.

In FIG. 23, "x" in the code indicates that its bit is not particularly prescribed. That is, it is decided by 3 bits from the head of the cut 12-bit code that the code corresponds to a code name "INDEX00." However, all of 12 bits of the cut 12-bit code need to be checked in order to determine whether the code corresponds to a code name "INDEX29."

As described above, among the codes with a code length of 3 bits to 12 bits, four codes ("0b111111111011" to "0b111111111110") with a code length of 12 bits are present as the Huffman tree, but no valid values are allocated to the four codes. That is, the four codes are not included in the reverse code table and cannot appear during decoding when the code data is normal. Therefore, when the 12-bit code cut from the head of the code that has not been decoded is any one of the four codes, it may be determined that the syntax error occurs.

Next, the detection of the semantic error will be described with reference to FIGS. 24 to 28. FIG. 24 is a diagram illustrating an example of the MTF coding process in detail. In FIG. 24, "0x" indicates that a numerical value following "0x" is represented by a hexadecimal number. For example, the length of pixel data is 16 bits and the image data is coded for every 16 bits. When data at the head, that is, zeroth data "0xFFFF" is input, ESC coding is performed on the zeroth data since no data is registered in the dictionary, and the data "0xFFFF" is registered as dictionary data in the dictionary so as to be associated with the first index value "00."

Since the first data "0xFFFF" is identical to dictionary data with the index value "00," it is encoded into a code corresponding to the index value "00." Since the second data "0xF333" is not registered in the dictionary, ESC coding is performed on the second data "0xF333," the dictionary is updated, and the second data "0xF333" is registered at the head of the dictionary. Since the third data "0x3333" is not registered in the dictionary, ESC coding is performed on the third data "0x3333," the dictionary is updated, and the third data "0x3333" is registered at the head of the dictionary. Since the fourth data "0x3333" is identical to the dictionary data with the index value "00," it is encoded into a code corresponding to the index value "00." Since the fifth data "0x3333" is identical to the dictionary data with the index value "00," it is encoded into a code corresponding to the index value "00." Since the sixth data "0x333F" is not registered in the dictionary, ESC coding is performed on the sixth data "0x333F," the dictionary is updated, and the sixth data "0x333F" is registered at the head of the dictionary. Since the seventh data "0xFFFF" is identical to dictionary data with an index value "03" in the dictionary, it is encoded into a code corresponding to the index value "03." In addition, since the seventh data is the line end data, the line end code is added to the seventh data.

Figures 25A, 25B:
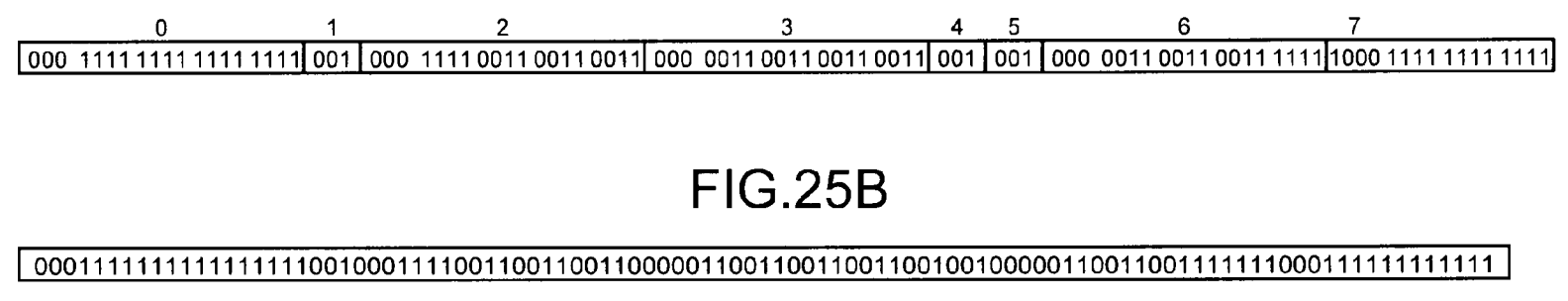

FIGS. 25A and 25B show the encoded codes shown in FIG. 24 with concrete values. For ease of understanding, FIG. 25A illustrates the original image data such that a delimiter is associated with the code, and illustrates the code for every 4 bits. FIG. 25B illustrates the codes shown in FIG. 25A such that the representation thereof is close to the actual representation. As such, the codes of index-coded or ESC-coded 16 bits of the image data are consecutively arranged to form code data corresponding to one line. Since each code is a variable-length code based on a Huffman code rule, the codes need to be sequentially decoded from the head of the code data.

FIG. 26 is a diagram illustrating in detail an example of the MTF code decoding process using the code data shown in FIGS. 25A and 25B as an example. In this embodiment, 12 bits are cut from the head of a portion of the code data that has not been decoded and are then decoded. It is determined whether 12 bits are any one of an index code, an ESC code, and a line end code from 2 bits from the head of the 12-bit code cut from the code data and all of the 12 bits.

That is, when 2 bits from the head are a value "00," the 12 bits is a portion of the ESC code. When 2 bits from the head are not the value "00," the 12 bits are the index code or the line end code. When the 12 bits are the ESC code, a 16-bit code is extracted from the fourth bit of the 12 bits of the code data and is used as 16-bit image data without any change, and a bit following the 16 bits is used as the head of the non-decoded portion.

When the 12 bits have consecutive values of "1," the 12 bits are the line end code. In the other cases, the 12 bits are the index code. In this case, a corresponding index code is searched with reference to the reverse code table based on the 12 bits. In the reverse code table, the code name associated with the searched index code is calculated, and dictionary data corresponding to the code name is calculated from the dictionary and is used as the image data. In the code data, a bit following the bits corresponding to the length of the searched index code is used as the head of the non-decoded portion.

As can be seen from FIG. 26, in the zeroth process, a 12-bit code from the head of the non-decoded portion has a value "0b000111111111" and the code is the ESC code since a 3-bit code from the head has a value "0b000." In this way, a 16-bit code (in this example, a value "0b1111111111111111"=a value "0xFFFF") added to 3 bits of the ESC header is output as the image data, and the head of the code data that has not been decoded is shifted by the consumed 19 bits. In addition, the image data with the value "0xFFFF" is registered as dictionary data of the code name "INDEX00" in the dictionary to update the dictionary.

As can be seen from FIG. 26, in the first process, a 12-bit code from the head of the non-decoded portion is "0b001000111100" and the code includes an index code of the code name "INDEX00" since 3 bits from the head are a value "001." In this way, dictionary data "0xFFFF" corresponding to the code name "INDEX00" is output as the image data and the head of the code data that has not been decoded is shifted by the consumed 3 bits.

As can be seen from FIG. 26, in the second process, a 12-bit code from the head of the non-decoded portion is a value "0b000111100110" and the code is the ESC code since 3 bits from the head are a value "0b000." In this way, a 16-bit code (in this example, a value "0b1111001100110011"=a value "0xF333") added to 3 bits of the ESC header is output as the image data, and the head of the code data that has not been decoded is shifted by the consumed 19 bits. In addition, the image data with the value "0xF333" is registered as the dictionary data of the code name "INDEX00" in the dictionary to update the dictionary.

As can be seen from FIG. 26, in the third process, a 12-bit code from the head of the non-decoded portion is a value "0b000001100110" and the code is the ESC code since 3 bits from the head are a value "0b000." In this way, a 16-bit code (in this example, a value "0b0011001100110011"=a value "0x3333") added to 3 bits of the ESC header is output as the image data, and the head of the code data that has not been decoded is shifted by the consumed 19 bits. In addition, the image data with the value "0x3333" is registered as the dictionary data of the code name "INDEX00" in the dictionary to update the dictionary.

As can be seen from FIG. 26, in the fourth process, a 12-bit code from the head of the non-decoded portion is a value "0b001001000001" and the code includes the index code of the code name "INDEX00" since 3 bits from the head are a value "001." In this way, dictionary data "0x3333" corresponding to the code name "INDEX00" is output as the image data and the head of the code data that has not been decoded is shifted by the consumed 3 bits.

As can be seen from FIG. 26, in the fifth process, a 12-bit code from the head of the non-decoded portion is a value "0b001000001100" and the code includes the index code of the code name "INDEX00" since 3 bits from the head are a value "001." In this way, the dictionary data "0x3333" corresponding to the code name "INDEX00" is output as the image data and the head of the code data that has not been decoded is shifted by the consumed 3 bits.

As can be seen from FIG. 26, in the sixth process, a 12-bit code from the head of the non-decoded portion is a value "0b000001100110" and the code is the ESC code since 3 bits from the head are a value "0b000." In this way, a 16-bit code (in this example, a value "0b0011001100111111"=a value "0x333F") added to 3 bits of the ESC header is output as the image data, and the head of the code data that has not been decoded is shifted by the consumed 19 bits. In addition, the image data with the value "0x333F" is registered as the dictionary data of the code name "INDEX00" in the dictionary to update the dictionary.

As can be seen from FIG. 26, in the seventh process, a 12-bit code from the head of the non-decoded portion is a value "0b100011111111" and the code includes the index code of the code name "INDEX03" since 4 bits from the head are a value "1000." In this way, the dictionary data "0xFFFF" corresponding to the code name "INDEX03" is output as the image data and the head of the code data that has not been decoded is shifted by the consumed 4 bits.

As can be seen from FIG. 26, in the eighth process, a 12-bit code from the head of the non-decoded portion is a value "0b111111111111" and the code is the line end code. Therefore, the decoding process for the line ends.

Next, a case in which an error is included in the code data to be decoded will be described with reference to FIGS. 27A, 27B, and 28. For example, code data shown in FIG. 27A is considered. The code data shown in FIG. 27A is the same as that shown in FIG. 25A. In the code data shown in FIG. 27A, positions 500A to 500E indicate the boundaries of the image data.

A case in which, in the code data shown in FIG. 27A, the value of a third bit in the code "0b0001111001100110011" of the second image data is changed from "0" to "1" is considered.

In this case, as shown in FIG. 27B, since the original code "b 0b0001111001100110011" is changed to a code "0b0011111001100110011" due to a code error, it is determined that the code includes an index code of the code name "INDEX00" on the basis of 3 bits ("001") from the head with reference to the reverse code table. Therefore, as shown in the second item "decoded 16-bit image data" of FIG. 28, the dictionary data corresponding to the code name "INDEX00" is output as the image data and the head of the code data that has not been decoded is shifted by the consumed 3 bits. That is, the rear end of the second image data in the code data is a position 501A and deviates from the position 500A which is the rear end of the second image data when there is no code error as shown in FIG. 27A.

It is determined that a new 12-bit code "0b111100110011" from the head of the code data which has not been decoded includes a 6-bit (which is "111100" and the code has a code name "INDEX19") index code from the head. Therefore, as shown in the third item "decoded 16-bit image data" of FIG. 28, the dictionary data corresponding to the code name "INDEX19" is output as the image data and the head of the code data that has not been decoded is shifted by the consumed 6 bits. Since the dictionary data corresponding to the code name "INDEX19" has not been registered in the dictionary yet, the value of the image data to be output is unfixed.

Similarly, even when there is a code error, decoding is performed according to the reverse code table, as shown in the second and subsequent image data items of FIG. 27B and FIG. 28. As described above, the code table uses most of the codes from a code with a code length of 3 bits to a code with a code length of 12 bits except for some of the codes with a code length of 12 bits according to the Huffman tree. Therefore, even when some of the codes are changed due to an error, the changed codes are included in the code table (reverse code table) and the possibility of the codes being decoded is high. That is, the error is not an error occurring in the code format, but is the semantic error revealed after decoding.

In the case of the semantic error, it is considered that, for correct code data without an error, the number of image data items before coding is different from that after coding. In the example shown in FIGS. 27A and 27B, when no code error occurs, the boundaries between the second and subsequent image data items are disposed at the positions 500A to 500E as shown in FIG. 27A. However, when a 1-bit code error occurs, the boundaries between the second and subsequent image data items are disposed at positions 501A to 501H as shown in FIG. 27B. As a result, when no code error occurs, the number of image data items in one is 8. However, when a code error occurs, the number of image data items in one line is 11. Therefore, the number of image data items increases due to the occurrence of the 1-bit code error.

It is possible to detect the semantic error by comparing the number of pixels in the line after decoding with the number of horizontal pixels that is designated as the number of pixels in one line in advance. It is considered that, even when a code error occurs, there is no change in the number of pixels. In this case, a code length corresponding to one page may be counted and the code length may be compared with a predetermined code length corresponding to one page, thereby detecting the semantic error.

Details of Decoding Process

FIG. 29 is a flowchart illustrating an example of the overall flow of the decoding process. In Step S100, the decoding processing unit 304 clears the count value IY of the line counter and the count value C of the code counter to "0." In Step S101, the count value LM of the line memory counter 321 is cleared to "0."

In Step S102, the decoding processing unit 304 performs the decoding process on a line-to-line basis. When data corresponding to one line is decoded, the decoding processing unit 304 increases the count value IY by 1 in Step S103 and determines whether the count value IY has been processed up to the height of the image in Step S104. Information indicating the height of the image can be acquired on the basis of the information of a sheet size, a print direction (the direction of the sheet), and print resolution included in print attribute data. When it is determined that the count value IY does not reach the height of the image, the process returns to Step S101 and starts to be performed on the next line.

On the other hand, when it is determined in Step S104 that the process has been performed up to the height of the image, the process proceeds to Step S105. In Step S105, the decoding processing unit 304 determines whether the code count value C is less than a predetermined code length. When it is determined that the code count value C is not less than the predetermined code length, it is determined that the decoding process corresponding to one page has ended and a series of processes in the flowchart of FIG. 29 ends.

On the other hand, when it is determined in Step S105 that the code count value C is less than the predetermined code length, the decoding processing unit 304 moves the process to Step S106. In Step S106, the Huffman decoding unit 311 determines that a code error occurs and inputs an interrupt signal including an error status indicating the kind of error generated and the code count value C to the CPU 200 to interrupt the CPU 200.

Specifically, in the decoding processing unit 304, the Huffman decoding unit 311 generates a semantic error signal, which is information indicating the semantic error, using the error status value as a value indicating the semantic error. Then, the Huffman decoding unit 311 outputs the generated semantic error signal and the code count value C to the error signal generating unit 305. The error signal generating unit 305 generates an error signal including the information indicating the semantic error and the code count value C and transmits the error signal to the interrupt controller 250. The interrupt controller 250 generates an interrupt signal including the information indicating the semantic error and the code count value C on the basis of the received error signal and inputs the interrupt signal to the CPU 200 to interrupt the CPU 200.

When receiving the interrupt signal with the detection of the error in Step S106, the CPU 200 controls the engine controller 210 to stop the printing process of the printer engine 260, as represented by a path L in FIG. 5. When the printer engine 260 is an ink jet type, it is considered that the printing head floats and the discharge of ink stops. In a laser printer, it is considered that the radiation of a laser beam is stopped to stop the printing process.

However, the invention is not limited thereto. For example, the decoding process of the decoding unit 209 may be stopped to stop the printing process. In addition, the transmission of print data to the printer engine 260 may be stopped.

Figure 30:
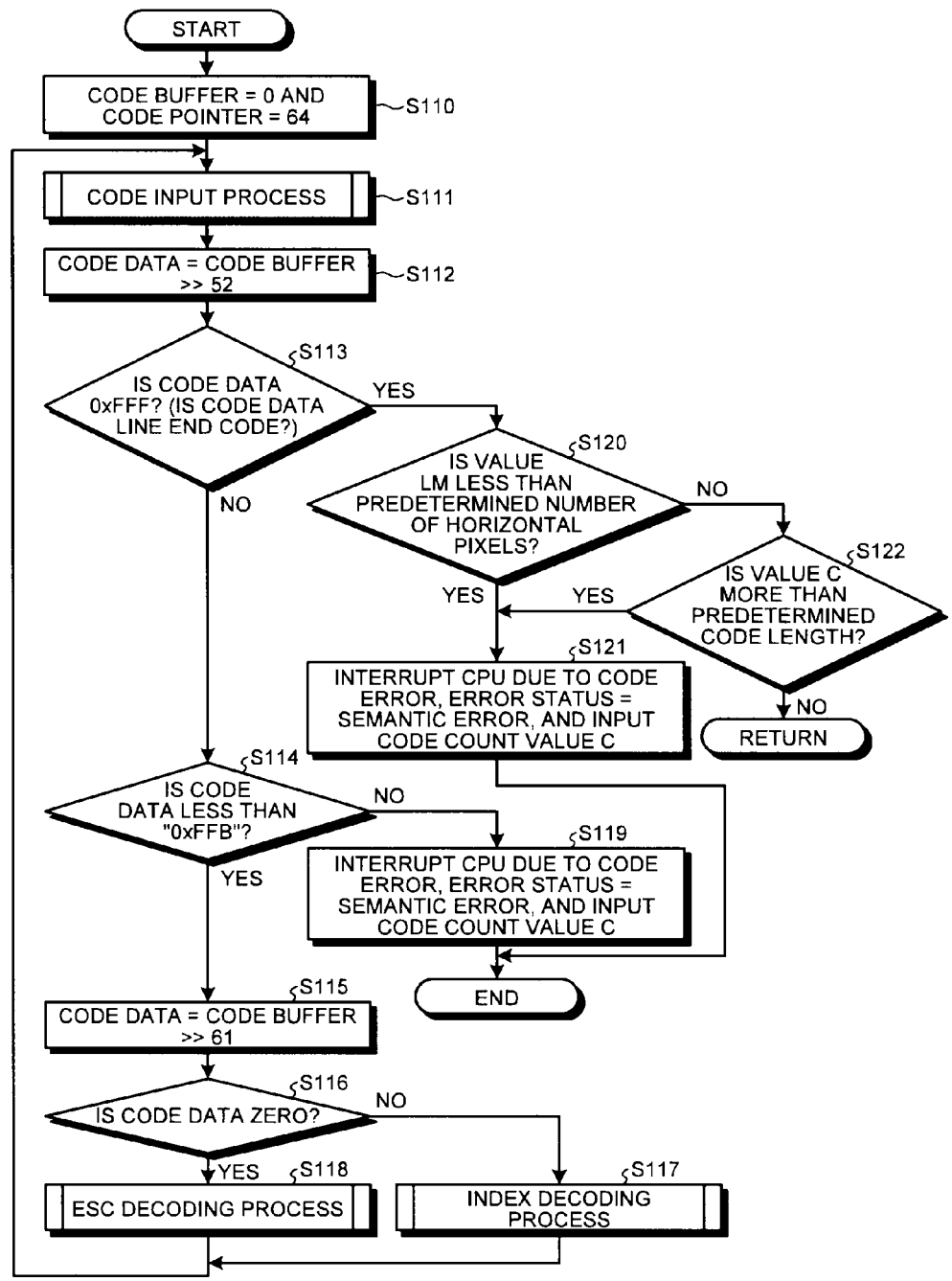
FIG. 30 is a flowchart illustrating in detail the decoding process on a line-to-line basis.

FIG. 30 is a flowchart illustrating an example of the details of the decoding process for each line in Step S102 of FIG. 29. In Step S110, the Huffman decoding unit 311 initializes a code buffer (not shown) of the Huffman decoding unit 311 to be empty (0 bit) and initializes the code pointer to 64 bits.

In Step S111, the Huffman decoding unit 311 reads the code data using a code input process and stores the read code data in the code buffer from the head. In Step S112, the Huffman decoding unit 311 shifts the code buffer to the right by 52 bits. In this way, code data corresponding 12 bits from the code data stored in the code buffer is cut out. In Step S113, the Huffman decoding unit 311 determines whether the value of the 12-bit code data cut out in Step S112 is "0xFFF" (="0b111111111111"), that is, whether the 12-bit code data is the line end code. When it is determined that the 12-bit code data is not the line end code, the process proceeds to Step S114.

In Step S114, the Huffman decoding unit 311 determines whether the value of the 12-bit code data cut out in Step S112 is less than a value "0xFFB" (="0b111111111011"). That is, in Step S114, the Huffman decoding unit 311 determines whether the 12-bit code data is the "impossible code" described with reference to FIG. 22. When the value of the 12-bit code data is equal to or more than the value "0xFFB" and is less than a value "0xFFF," the 12-bit code data may be determined to be the "impossible code" and the syntax error is detected. Whether the value of the 12-bit code data is less than the value "0xFFF" may be known by the determination in Step S113.

When it is determined in Step S114 that the value of the 12-bit code data is less than the value "0xFFB," the Huffman decoding unit 311 moves the process to Step S115, shifts the code buffer to the right by 61 bits, and cuts out 3 bits from the head of the code data. In Step S116, the Huffman decoding unit 311 determines whether the value of the cut out 3-bit code data is a value "0," that is, a value "0b000." When it is determined that the value of the 3-bit code data is the value "0," the code data following the 3 bits is an ESC code. When it is determined that the value of the 3-bit code data is not the value "0," the code data following the 3 bits is an index code.

When it is determined in Step 5116 that the value of the 3-bit code data is the value "0," the Huffman decoding unit 311 moves the process to Step S118. In Step S118, the MTF decoding unit 312 decodes the ESC code. On the other hand, when it is determined that the value of the 3-bit code data is not the value "0," the process proceeds to Step S117. In Step S117, the MTF decoding unit 312 decodes the index code. When the decoding process in Step S117 or Step S118 ends, the process returns to Step S111 and the next code is input.

When it is determined in Step S113 that the value of the code data is the value "0xFFF," the Huffman decoding unit 311 moves the process to Step S120. In Step S120, the Huffman decoding unit 311 acquires the count value LM from the line memory counter 321 and determines whether the count value LM is less than a predetermined number of horizontal pixels. The predetermined number of horizontal pixels is read and acquired from the register 302 When it is determined that the count value LM is less than the predetermined number of horizontal pixels, the process proceeds to Step S121.

When it is determined in Step S120 that the count value LM of the line memory counter 321 is equal to or more than the predetermined number of horizontal pixels, the Huffman decoding unit 311 moves the process to Step S122. In Step S122, the code count value C is acquired from the code counter 320 and it is determined whether the code count value C is more than a predetermined code length. The predetermined code length is read and acquired from the register 303. When it is determined in Step S122 that the code count value C is more than the predetermined code length, the process proceeds to Step S121.

In Step S121, the Huffman decoding unit 311 determines that a code error occurs due to the semantic error and inputs an interrupt signal including error status indicating the kind of error generated and the code count value C to the CPU 200 to interrupt the CPU 200. For example, as described above, the CPU 200 controls the engine controller 210 to stop the printing process in response to the interrupt. The process of interrupting the CPU 200 is the same as that described in Step S106 of FIG. 29 and thus a detailed description thereof will be omitted.

When it is determined in Step S122 that the code count value C is not more than the predetermined code length, a series of processes in the flowchart of FIG. 30 ends and the process proceeds to Step S103 in FIG. 29.

When it is determined in Step S114 that the value of the code data is equal to or more than the value "0xFFB," the process proceeds to Step S119. In this case, the code data cut out in Step S112 is absent in the reverse code table, that is, the code data is an "impossible code." Therefore, in Step S119, the Huffman decoding unit 311 determines that a code error occurs due to the syntax error and inputs an interrupt signal including error status indicating the kind of error generated and the code count value C to the CPU 200 to interrupt the CPU 200. For example, as described above, the CPU 200 controls the engine controller 210 to stop the printing process in response to the interrupt. The process of interrupting the CPU 200 is the same as that when the semantic error occurs in Step S106 of FIG. 29 and thus a detailed description thereof will be omitted.

Figure 31:
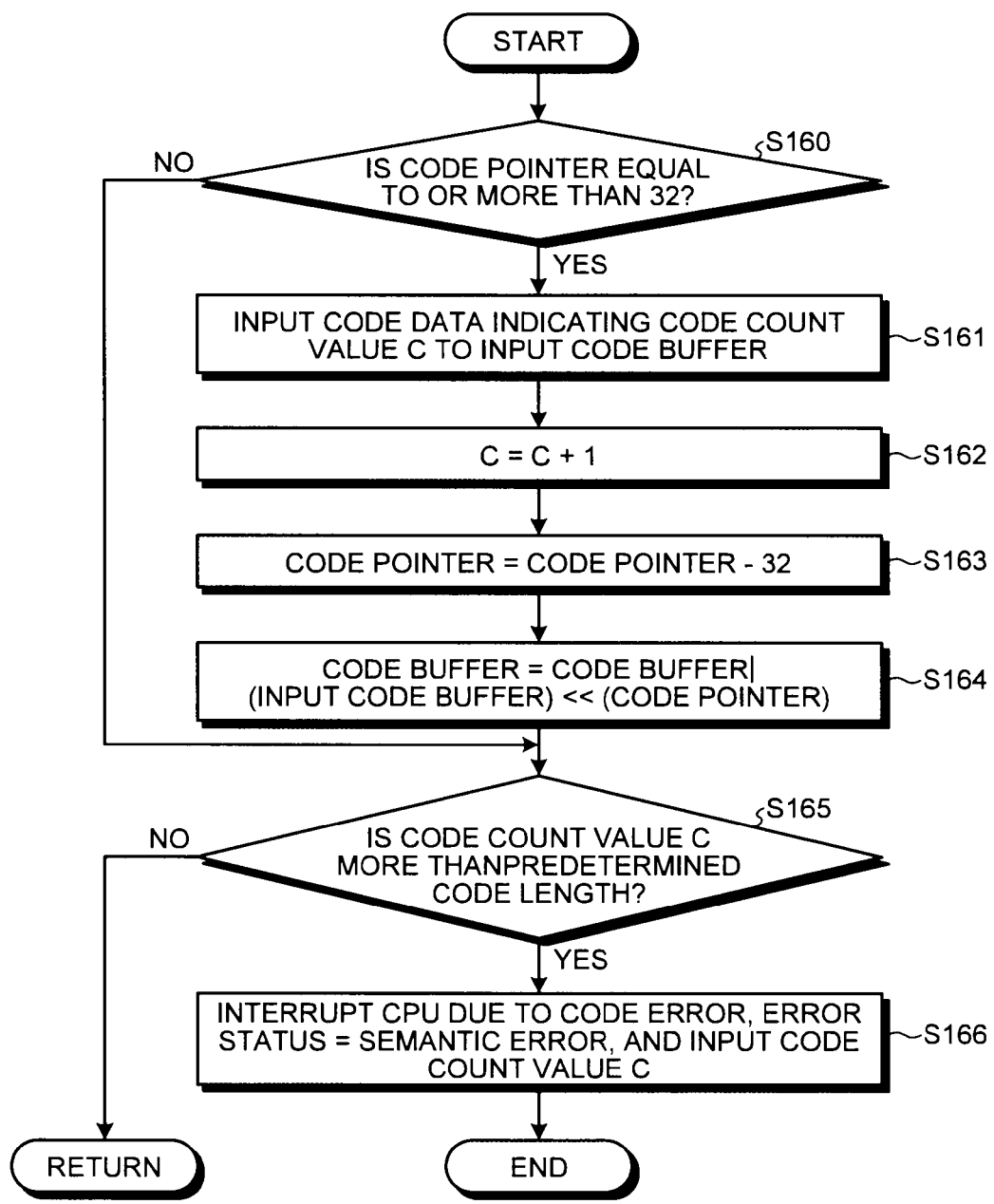
FIG. 31 is a flowchart illustrating an example of a code input process.

FIG. 31 is a flowchart illustrating an example of the code input process in Step S111. In the first step S160, the Huffman decoding unit 311 determines whether the value of the code pointer is equal to or more than 32. When it is determined that the value of the code pointer is less than one word, that is, 32, the process proceeds to Step S165. On the other hand, when it is determined that the value of the code pointer is equal to or more than 32, the process proceeds to Step S161.

In Step S161, the code reading unit 310 reads the code data from the address indicated by the code count value C in the main memory 230 and stores the read code data in the input code buffer of the Huffman decoding unit 311. In Step S162, the code count value C is increased by 1. In Step S163, 32 is subtracted from the value of the code pointer to obtain a new value of the code pointer. In Step S164, the code data of the input code buffer is added to the position indicated by the code pointer in the code buffer and the process proceeds to Step S165.

In Step S165, the Huffman decoding unit 311 determines whether the code count value C is more than a predetermined code length. The information of the predetermined code length is acquired from the register 303. When it is determined that the code count value C is not more than the predetermined code length, a series of processes in the flowchart of FIG. 31 ends and the process returns to the initial step of the flowchart.

On the other hand, when it is determined Step S165 that the code count value C is more than the predetermined code length, the Huffman decoding unit 311 moves the process to Step S166. In this case, it is considered that the semantic error occurs in the code data. Therefore, in Step S166, similar to, for example, Step S106, the error status indicates the semantic error and the error signal generating unit 305 generates an error signal including a syntax error signal, which is information indicating the syntax error, and the code count value C to interrupt the CPU 200. When receiving the interrupt signal, the CPU 200 stops the printing process in the same way as described above.

Figure 32:
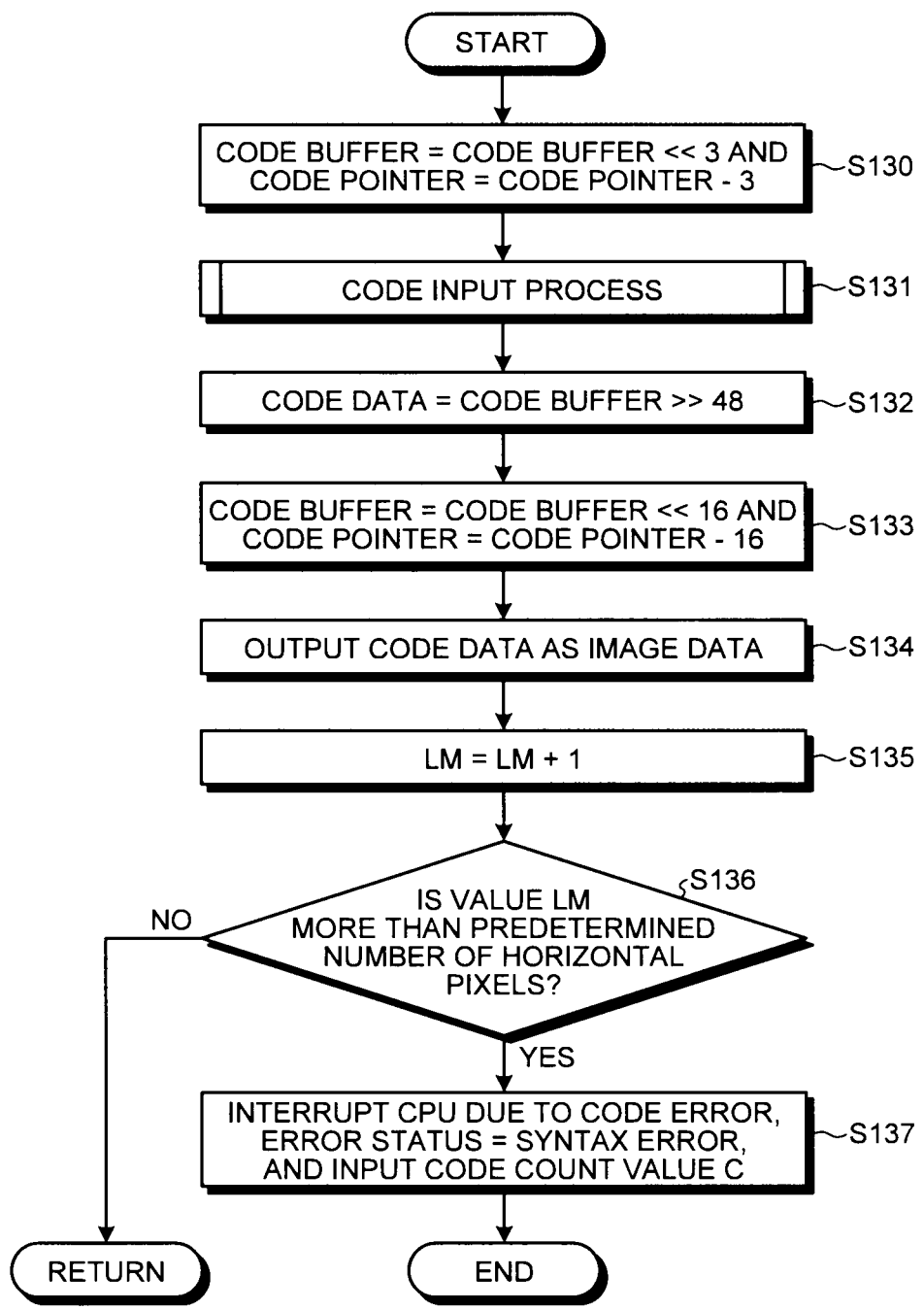
FIG. 32 is a flowchart illustrating an example of an ESC code decoding process.

FIG. 32 is a flowchart illustrating an example of the ESC code decoding process in Step S118. In Step S130, the code buffer is shifted 3 bits to the left and the value of the code pointer is reduced by 3, and the ESC header is removed. In Step S131, the code input process is performed in the same way as that described with reference to FIG. 31 and the code data is input from the code buffer of the Huffman decoding unit 311 to the MTF decoding unit 312. In Step S132, the Huffman decoding unit 311 shifts the code buffer to the right by 48 bits and cuts 16-bit code data. In Step S133, the code buffer is shifted 16 bits to the left and 16 bits are subtracted from the value of the code pointer to update the code pointer.

In Step S134, the 16-bit code data cut in Step S132 is output as image data. The image data is supplied to the image data writing unit 313 and is then stored in the image line memory (not shown). When the image data is stored in the image line memory, the count value LM of the line memory counter is increased by 1.

In Step S136, it is determined whether the count value LM of the line memory counter 321 is more than a predetermined number of horizontal pixels. When it is determined that the count value LM is not more than the predetermined number of horizontal pixels, a series of processes in the flowchart of FIG. 31 ends and the process returns to Step S111 in the flowchart of FIG. 29.

On the other hand, when it is determined in Step S136 that the count value LM is more than the predetermined number of horizontal pixels, the Huffman decoding unit 311 moves the process to Step S137. In this case, it is considered that the semantic error occurs in the code data. Therefore, in Step S137, similar to Step S106, the error status indicates the semantic error and the error signal generating unit 305 generates an error signal including a syntax error signal, which is information indicating the syntax error, and the code count value C to interrupt the CPU 200. When receiving the interrupt signal, the CPU 200 stops the printing process in the same way as described above.

Figure 33:
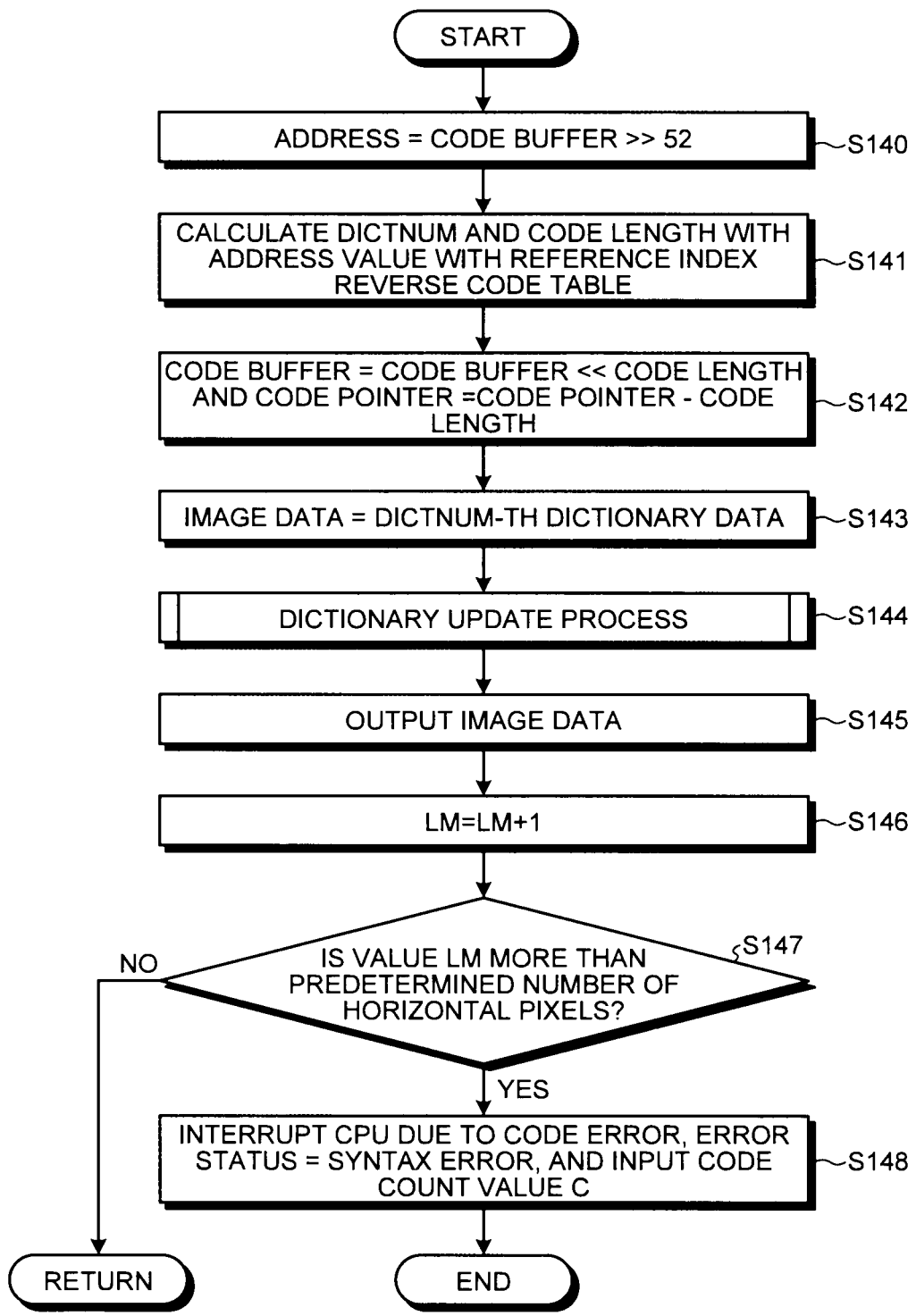
FIG. 33 is a flowchart illustrating an example of an index code decoding process.

FIG. 33 is a flowchart illustrating an example of the index code decoding process in Step S117. In Step S140, the Huffman decoding unit 311 shifts the code buffer to the right by 52 bits. In this way, 12 bits are cut out from the code data and an address value is obtained. In Step S141, the code in the index reverse code table shown in FIG. 23 is referred to with the address value. In this way, a code name corresponding to the address value is calculated and the value indicated by the code name is the value DICTNUM. In addition, a code length corresponding to the address value is calculated.

In Step S142, the code buffer is shifted to the left by the calculated code length and the code length is subtracted from the value of the code pointer to obtain a new code pointer, thereby updating the code pointer. In Step S143, as shown in FIG. 34, an access to the dictionary is performed using the value DICTNUM as an index and dictionary data is calculated. In Step S144, the dictionary is updated. In Step S145, the MTF decoding unit 312 outputs the dictionary data calculated in Step S143 as the image data. In the example shown in FIG. 34, dictionary data "0x5555" corresponding to the value DICTNUM=14 is output as the image data.

When the image data is output, the count value LM of the line memory counter 321 is increased by 1 in Step S146. In Step S147, the MTF decoding unit 312 determines whether the count value LM is more than a predetermined number of horizontal pixels. When it is determined that the count value LM is not more than the predetermined number of horizontal pixels, a series of processes in the flowchart of FIG. 33 ends and the process returns to Step S111 in the flowchart of FIG. 30.

On the other hand, when it is determined in Step S147 that the count value LM is more than the predetermined number of horizontal pixels, the Huffman decoding unit 311 moves the process to Step S148. In this case, it is considered that the semantic error occurs in the code data. Therefore, in Step S148, similar to Step S106, the error status indicates the semantic error and the error signal generating unit 305 generates an error signal including a syntax error signal, which is information indicating the syntax error, and the code count value C to interrupt the CPU 200. When receiving the interrupt signal, the CPU 200 stops the printing process in the same way as described above.

Regarding Display of Error

Figure 35:
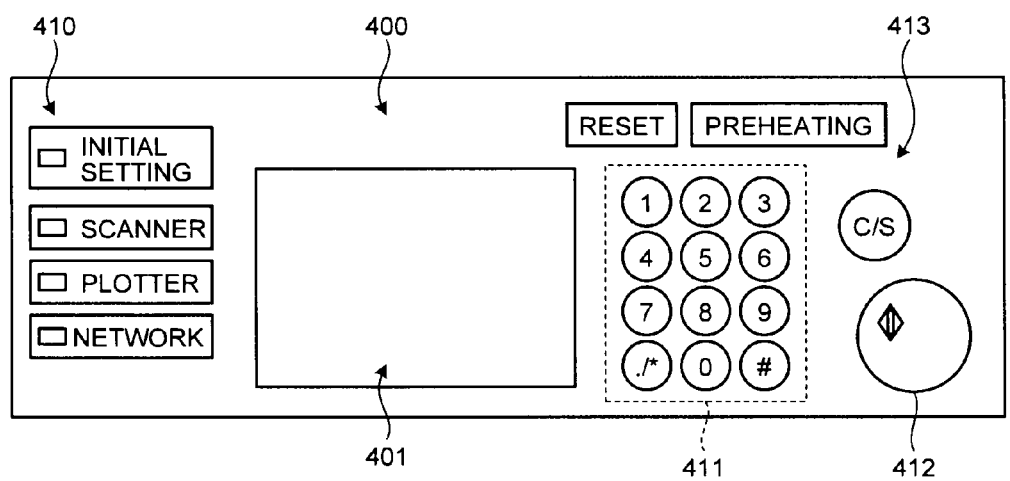
FIG. 35 is a diagram schematically illustrating the appearance of an example of an operation panel of a printer.

When the code error is detected as described above, it is preferable that the printing operation is stopped and information indicating that the code error has occurred be notified to the user. Next, an example in which the occurrence of an error is displayed in the printer 60 and is notified to the user will be described. FIG. 35 illustrates the appearance of an example of an operation panel 400, which is a combination of the input unit 221 and the display 229, in the printer 60. The operation panel 400 includes a display unit 401 and manipulanda, such as button groups 410 and 413 and a start button 412.

The display unit 401 is a so-called touch panel in which the display 229 and manipulanda that output a signal corresponding to a pressed position of the input unit 221 are integrally formed. The button groups 410 and 413 and the start button 412 correspond to the input unit 221 and receive a user input. The button group 410 includes, for example, a plurality of manipulanda for initial setting or selecting the function of the printer 60. The button group 413 includes a numerical keypad 411 and a plurality of manipulanda for inputting a numerical value, resetting the input numerical value, switching preheating, and stopping the operation.

The start button 412 instructs the start of the printing operation. For example, when the start button 412 is operated, code data is read from the main memory 230 and is then decoded into image data by the decoding unit 209. The image data is supplied to the engine controller 210 and the printer engine 260 is driven to start the printing operation. However, the invention is not limited thereto, but the printing operation may be started by a printing start command transmitted from the printer server 50.

Figure 36:
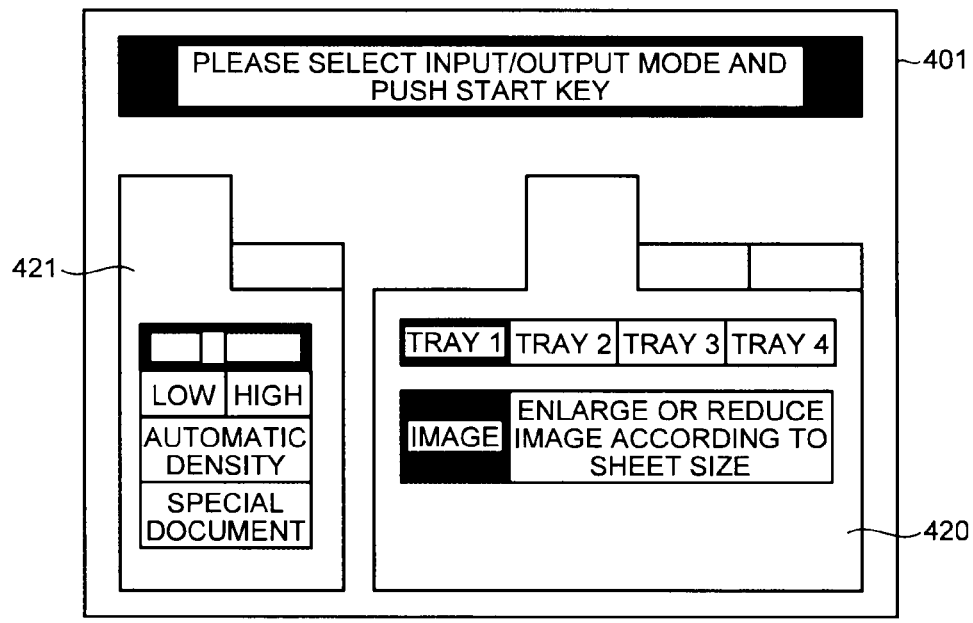
FIG. 36 is a diagram schematically illustrating an example of a general operation screen displayed on a display unit.

FIG. 36 illustrates an example of a general operation screen displayed on the display unit 401. The general operation screen includes an output format selection area 420 and an input format selection area 421. The input format selection area 421 can designate the input position of print data. The output format selection area 420 can designate, for example, a print sheet (for example, a size and a direction) and a magnification during printing.

Figure 37:
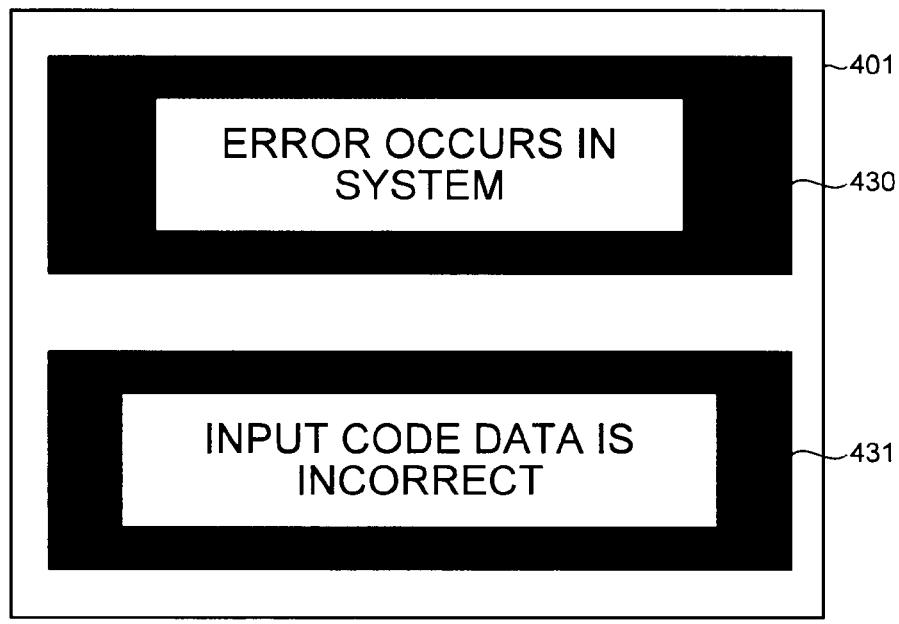
FIG. 37 is a diagram schematically illustrating an example of the display of an error on the display unit when a code error is detected.

FIG. 37 illustrates an example of the display of an error on the display unit 401 when a code error is detected. In the example shown in FIG. 37, an error notification 430 that notifies the detection of an error and an error cause notification 431 that notifies the cause of the error are displayed on the display unit 401. As shown in FIG. 37, the error notification 430 and the error cause notification 431 may be displayed on the entire surface of the display unit 401 or they may be displayed in a portion of the display unit 401.

That is, when an error is detected from the code data, as described above, the decoding unit 209 outputs an error signal including an error status value and the CPU 200 is interrupted along the path K shown in FIG. 5 on the basis of the error signal. The CPU 200 controls the engine controller 210 to stop the printing operation in response to the interrupt. In addition, the CPU 200 generates a display control signal for displaying the error notification 430 and the error cause notification 431 and transmits the display control signal to the display controller 228 along the path M. The display controller 228 drives the display 229 in response to the received display control signal to display the error notification 430 and the error cause notification 431 on the display unit 401.

However, the error notification method is not limited to the display of the error notification on the display unit 401. For example, Light Emitting Diodes (LEDs) may be used to provide a display unit only for displaying the error notification, or a voice output unit may be provided to notify the occurrence of an error with a voice. In addition, the printer server 50 may notify the occurrence of an error. For example, the CPU 200 generates an error notification signal in response to an interrupt signal based on an error signal and transmits the error notification signal to the printer server 50 through the network. Then, the error notification signal is transmitted to the CPU 100. The CPU 100 displays the error on the display 109 in response to the error notification signal, for example.

As described above, according to this embodiment, the syntax error or the semantic error of the code data is detected. When the error is detected, the printing process is stopped. Therefore, even when an error occurs in the code data, it is possible to prevent a load from being applied to a printing mechanism of a printer. In addition, it is possible to prevent print quality from deteriorating due to the code data with an error.

This embodiment can be applied to a process of coding and decoding small-value image data after a gradation process and a process of coding and decoding multi-valued image data before the gradation process. In the above-described embodiments, the MTF coding method is used as the image data coding method, but the invention is not limited thereto. For example, a run length coding method that calculates the number (run length) of consecutive data items with the same value may be applied to the image data coding method according to this embodiment.

In the above-described embodiments, the printer 60 having only a function of printing the image data is given as an example, but the invention is not limited thereto. For example, this embodiment can be applied to a multi-function machine that performs a printer function, a scanner function, a copier function, and a FAX function in one housing.

According to the invention, it is possible to reduce the load applied to a printing mechanism when an error occurs in code data obtained by encoding image data with variable-length codes.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    a decoding unit that decodes code data, which is obtained by encoding image data with a variable-length code on a line-to-line basis, into the image data;
    a printing unit that performs a printing process on the basis of the image data which is decoded from the code data by the decoding unit;
    an error detecting unit that compares a decoding amount indicating the amount of code data decoded in a predetermined range by the decoding unit with a predetermined decoding amount and outputs an error signal when the decoding amount is different from the predetermined decoding amount; and
    a control unit that controls the printing unit to stop the printing process when the error signal is output from the error detecting unit.

2. The image processing apparatus according to claim 1, further comprising:
    a counting unit that counts the number of pixels of the image data corresponding to one line which is decoded from the code data by the decoding unit as the decoding amount,
    wherein the predetermined range is one line, and
    wherein, the error detecting unit compares the number of pixels counted by the counting unit with a predetermined number of pixels corresponding to one line and outputs the error signal when the number of pixels is different from the predetermined number of pixels.

3. The image processing apparatus according to claim 1, further comprising:
    a code length acquiring unit that calculates the code length of the code data corresponding to one page which is decoded into the image data by the decoding unit as the decoding amount,
    wherein the predetermined range is one page, and
    wherein the error detecting unit compares the code length of the code data corresponding to one page which is acquired by the code length acquiring unit with a predetermined code length, and outputs the error signal when the code length is different from the predetermined code length.

4. The image processing apparatus according to claim 1, further comprising:
    a code table which is referred to when the decoding unit decodes the variable-length code and in which the variable-length code is associated with an index value indicating a data value,
    wherein the error detecting unit determines that there is an error in the code data when a variable-length code that is not included in the code data is detected from the code table during the decoding of the code data by the decoding unit and outputs the error signal.

5. The image processing apparatus according to claim 1, wherein the control unit controls the decoding unit to stop the decoding process when the error signal is output from the error detecting unit.

6. The image processing apparatus according to claim 1, wherein the code data is encoded using a dynamic dictionary.

7. The image processing apparatus according to claim 1, further comprising:
    a display unit that displays information,
    wherein the control unit displays information indicating the occurrence of an error on the display unit when the error signal is output from the error detecting unit.

8. An image processing method comprising:
    a decoding step of allowing a decoding unit to decode code data, which is obtained by encoding image data with a variable-length code on a line-to-line basis, into the image data;
    a printing step of allowing a printing unit to perform a printing process on the basis of the image data which is decoded from the code data in the decoding step;
    an error detecting step of allowing an error detecting unit to compare a decoding amount indicating the amount of code data decoded in a predetermined range in the decoding step with a predetermined decoding amount, and to output an error signal when the decoding amount is different from the predetermined decoding amount; and
    a control step of allowing a control unit to control the printing step to stop the printing process when the error signal is output from the error detecting step.

* * * * *